US009641984B2

(12) United States Patent
Edge et al.

(10) Patent No.: US 9,641,984 B2
(45) Date of Patent: May 2, 2017

(54) SUPPORT OF OTDOA POSITIONING USING AMBIGUOUS CELLS

(71) Applicant: QUALCOMM Incorporated, San Diego, CA (US)

(72) Inventors: Stephen William Edge, Escondido, CA (US); Sven Fischer, Nuremberg (DE); Kirk Allan Burroughs, Alamo, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/077,736

(22) Filed: Mar. 22, 2016

(65) Prior Publication Data
US 2016/0360370 A1 Dec. 8, 2016

Related U.S. Application Data

(60) Provisional application No. 62/171,314, filed on Jun. 5, 2015.

(51) Int. Cl.
*H04W 4/02* (2009.01)
*G01S 5/10* (2006.01)
(Continued)

(52) U.S. Cl.
CPC ............ *H04W 4/025* (2013.01); *G01S 5/10* (2013.01); *H04W 64/00* (2013.01); *H04W 16/24* (2013.01)

(58) Field of Classification Search
None
See application file for complete search history.

(56) References Cited

U.S. PATENT DOCUMENTS

2012/0276916 A1* 11/2012 Kazmi ................. G01S 5/0205
  455/452.1
2013/0033999 A1* 2/2013 Siomina ................ H04W 64/00
  370/252

FOREIGN PATENT DOCUMENTS

WO 2004080105 A2 9/2004
WO 2014058363 A1 4/2014

OTHER PUBLICATIONS

3rd Generation Partnership Project (3GPP). (Mar. 12, 2015). TS 36.214: Technical Specification Group Radio Access Network, Evolved Universal Terrestrial Radio Access (E-UTRA), Physical layer, Measurements (Release 12). vol. RAN WG1, No. V12.2.0, pp. 1-17, Mobile Competence Centre, France. Retrieved from https://portal.3gpp.org/desktopmodules/Specifications/SpecificationDetails.aspx?specificationId=2428 [XP050928079].
(Continued)

*Primary Examiner* — Diane Mizrahi
(74) *Attorney, Agent, or Firm* — Hunter Clark PLLC

(57) ABSTRACT

Techniques are discussed for supporting positioning with ambiguous wireless cells. An ambiguous cell may employ a Distributed Antenna System (DAS), one or more Remote Radio Heads (RRHs), repeaters or relays, or may broadcast the same Positioning Reference Signal (PRS) as another nearby cell. In example techniques, measurements of a radio source in an ambiguous cell (e.g. a DAS antenna element or RRH) may be used to identify the measured radio source. The measurements may be for the Observed Time Difference of Arrival (OTDOA) position method or the Enhanced Cell ID (ECID) position method. The determination of the measured radio source for an ambiguous cell may be used to improve a location estimate for a user equipment (UE).

30 Claims, 11 Drawing Sheets

(51) Int. Cl.
    *H04W 64/00*    (2009.01)
    *H04W 16/24*    (2009.01)

(56)    References Cited

OTHER PUBLICATIONS

3rd Generation Partnership Project (3GPP). (Mar. 24, 2015). TS 36.355: Technical Specification Group Radio Access Network, Evolved Universal Terrestrial Radio Access (E-UTRA), LTE Positioning Protocol (LPP) (Release 12). vol. RAN WG2. No. V12.4.0, pp. 1-126. Mobile Competence Centre, France. Retrieved from https://portal.3gpp.org/desktopmodules/Specifications/SpecificationDetails.aspx?specificationId=2441 [XP050928065].
International Search Report and Written Opinion—PCT/US2016/034958—ISA/EPO—Sep. 8, 2016—13 pgs.

* cited by examiner

SUPPORT OF OTDOA POSITIONING USING AMBIGUOUS CELLS

CROSS-REFERENCE TO RELATED APPLICATIONS

This application claims the benefit of and priority to provisional U.S. application Ser. No. 62/171,314, entitled "SUPPORT OF OTDOA POSITIONING USING AMBIGUOUS CELLS," filed Jun. 5, 2015, which is assigned to the assignee hereof and the content of which is incorporated herein by reference in its entirety.

BACKGROUND

Wireless communication systems have developed through various generations, including a first-generation analog wireless phone service (1G), a second-generation (2G) digital wireless phone service (including interim 2.5G networks) and third-generation (3G) and fourth-generation (4G) high speed data/Internet-capable wireless services.

More recently, Long Term Evolution (LTE) has been developed by the $3^{rd}$ Generation Partnership Project (3GPP) as a radio access network technology for wireless communication of high-speed data and packetized voice for mobile phones and other mobile terminals. LTE has evolved from the Global System for Mobile Communications (GSM) system and from derivatives of GSM, such as Enhanced Data rates for GSM Evolution (EDGE), Universal Mobile Telecommunications System (UMTS), and High-Speed Packet Access (HSPA).

In North America, wireless communications systems, such as LTE, use a solution for Enhanced 911, or E911, that links emergency callers with the appropriate public resources. The solution attempts to automatically associate the caller, i.e., the caller's user equipment (UE), with a specific location, such as a physical address or geographic coordinates. Automatically locating the caller with high accuracy (e.g., with a distance error of 50 meters or less) and providing the location to a Public Safety Answering Point (PSAP) can increase the speed with which the public safety side can locate the required resources during emergencies, especially where the caller may be unable to communicate his/her location (e.g. does not know the location or is unable to speak adequately). Accurately locating a user of a UE for other reasons can also be useful or important—e.g. to provide navigation assistance or direction finding to the user or to enable tracking of the user (or the UE) by another authorized user.

SUMMARY

To locate a UE geographically, there are several approaches. One is to use some form of terrestrial radio location based on measurements made by a UE of signals transmitted by wireless network base stations and access points (APs) and/or based on measurements made by network elements (e.g., base stations and/or APs) of signals transmitted by the UE. Another approach is to use a Global Positioning System (GPS) receiver or Global Navigation Satellite System (GNSS) receiver built into the UE itself. Terrestrial radio location in a cellular telephony system may use measurements made by a UE of transmission timing differences between pairs of base stations or APs and may employ trilateration or multilateration techniques to determine the position of the UE based on two, or more commonly three or more, timing difference measurements.

One such terrestrial radio location method that is applicable to measurements of LTE base stations (referred to as eNodeBs or eNBs) and that is standardized by 3GPP in 3GPP Technical Specifications (TSs) 36.211, 36.305, and 36.355 is Observed Time Difference of Arrival (OTDOA). OTDOA is a multilateration method in which the UE measures the time difference between specific signals (e.g. positioning reference signals) from several eNodeBs and either computes a location itself from these measurements or reports the measured time differences to an Enhanced Serving Mobile Location Center (E-SMLC) or to a Secure User Plane Location (SUPL) Location Platform (SLP), which then computes the UE's location. In either case, the measured time differences and knowledge of the eNodeBs' locations and relative transmission timing are used to calculate the UE's position. Another position method that is similar to OTDOA (in measuring time differences between different base stations at a UE) is known as Advanced Forward Link Trilateration (AFLT) which may be used to a locate a UE that is accessing a CDMA2000 network as defined by the $3^{rd}$ Generation Partnership Project 2 (3GPP2).

In OTDOA and AFLT based positioning methods, a UE may measure time differences for signals received from two or more base stations and/or APs within a communication network. Location information for the measured base stations and APs may include information regarding their locations (e.g. location coordinates) and transmission characteristics (e.g. transmission timing, transmission power, signal content and characteristics) and may be referred to as an almanac, a base station almanac (BSA), almanac data or BSA data. The observed time differences measured by a UE (e.g. for OTDOA or AFLT) may be used in conjunction with known BSA for the measured base stations (e.g. eNodeBs) and/or APs to calculate a position for the UE either by the UE or by a location server such as an E-SMLC or SLP. A problem may arise, however, if duplicated Radio Frequency (RF) signals are received and measured by the UE from different radio sources (e.g., simulcast). Examples of radio sources that may broadcast (or simulcast) duplicate signals include a Distributed Antenna System (DAS), Remote Radio Heads (RRHs), repeaters and relays. When OTDOA or AFLT positioning is attempted in an area where the UE is receiving duplicate signals from multiple radio sources, the signal measurements made by the UE for the duplicate signals are typically discarded (i.e., not used in the position calculations) because neither the UE nor the communication network can typically determine from which radio source(s) the duplicated signals were received from. If the radio source(s) cannot be determined, then the positioning methods which rely on knowledge of the location of the radio source(s) (e.g., OTDOA, AFLT) cannot be used. In certain cases, a network operator may turn off or reduce the transmission power for at least some signal content from duplicate radio sources in order to avoid or reduce the ambiguity of any measurements of these signals. However, this may also impair positioning of UEs by reducing the number of radio sources that a UE could otherwise measure.

An example of a method for locating a user equipment (UE) according to the disclosure includes providing location assistance data to the UE, such that the location assistance data includes at least one ambiguous cell, providing a request to the UE for measurement data, receiving measurement data from the UE, such that the measurement data includes at least one measurement for an ambiguous cell, such that the ambiguous cell utilizes at least one of a repeater, a remote radio head, a relay, a distributed antenna system or a positioning reference signal identical to that of another nearby cell, and calculating a current position of the UE based at least in part on the at least one measurement for the ambiguous cell.

Implementations of such a method may include one or more of the following features. The UE may be configured to access a Long Term Evolution (LTE) network and the at least one measurement for the ambiguous cell may be a reference signal time difference (RSTD) measurement for an Observed Time Difference of Arrival (OTDOA) position method. The ambiguous cell may be a reference cell. The ambiguous cell may be a neighbor cell. Providing the location assistance data to the UE may include sending an LTE Positioning Protocol (LPP) Provide Assistance Data message to the UE. Receiving the measurement data from the UE may includes receiving an LPP Provide Location Information message from the UE. Calculating the current position of the UE may be based on almanac data for the ambiguous cell. Calculating the current position of the UE may be based on a most likely antenna for the ambiguous cell.

An example of a method for locating a User Equipment (UE) according to the disclosure includes receiving location assistance data from a location server, such that the location assistance data includes an ambiguous cell, receiving a request for measurements from the location server, making one or more measurements for a plurality of cells wherein at least one measurement is for the ambiguous cell, such that the ambiguous cell utilizes one of a repeater, a remote radio head, a relay, a distributed antenna system or a positioning reference signal identical to that of another nearby cell, and enabling determination of a location for the UE based at least in part on the at least one measurement for the ambiguous cell.

Implementations of such a method may include one or more of the following features. Enabling the determination of the location for the UE comprises sending the measurements for the plurality of cells to the location server. Enabling the determination of the location for the UE comprises determining the location by the UE. Determining the location by the UE is based on the location assistance data. Determining the location by the UE is based on a most likely antenna associated with the ambiguous cell. Receiving the location assistance data from the location server may includes receiving an LTE Positioning Protocol (LPP) Provide Assistance Data message from the location server. Sending the measurements for the plurality of cells to the location server may include sending an LPP Provide Location Information message to the location server. The at least one measurement for the ambiguous cell may be a measurement of a reference signal time difference (RSTD) for an Observed Time Difference of Arrival (OTDOA) position method for LTE access. The ambiguous cell may be a reference cell. The ambiguous cell may be a neighbor cell.

An example of an apparatus for locating a user equipment (UE) according to the disclosure includes a memory, a communications subsystem, at least one processor operably coupled to the memory and the communications subsystem and configured to: provide location assistance data to the UE, wherein the location assistance data includes at least one ambiguous cell, provide a request to the UE for measurement data, receive the measurement data from the UE, such that the measurement data includes at least one measurement for an ambiguous cell, such that the ambiguous cell utilizes at least one of a repeater, a remote radio head, a relay, a distributed antenna system or a positioning reference signal identical to that of another nearby cell, and calculate a current position of the UE based at least in part on the at least one measurement for the ambiguous cell.

Implementations of such an apparatus may include one or more of the following features. The UE may be configured to access a Long Term Evolution (LTE) network and the at least one measurement for the ambiguous cell is a reference signal time difference (RSTD) measurement for an Observed Time Difference of Arrival (OTDOA) position method. The ambiguous cell may be a reference cell. The ambiguous cell may be a neighbor cell. The at least one processor may be configured to provide the location assistance data to the UE by sending an LTE Positioning Protocol (LPP) Provide Assistance Data message to the UE. The at least one processor may be configured to receive the measurement data from the UE by receiving an LPP Provide Location Information message from the UE. The at least one processor may be configured to calculate the current position of the UE based on almanac data for the ambiguous cell. The at least one processor may be configured to calculate the current position of the UE based on a most likely antenna for the ambiguous cell.

An example of an apparatus for locating a User Equipment (UE) according to the disclosure includes a memory, a communications interface, at least one processor operably coupled to the communications interface and the memory, and configured to: receive location assistance data from a location server, wherein the location assistance data includes an ambiguous cell, receive a request for measurements from the location server, determine measurements for a plurality of cells such that at least one measurement is for the ambiguous cell, such that the ambiguous cell utilizes one of a repeater, a remote radio head, a relay, a distributed antenna system or a positioning reference signal identical to that of another nearby cell, and determine a location for the UE based at least in part on the at least one measurement for the ambiguous cell.

Implementations of such an apparatus may include one or more of the following features. The at least one processor may be further configured to send the measurements for the plurality of cells to the location server. The at least one processor may be further configured to determine the location by the UE. The at least one processor may be further configured to receive location assistance data from the location server, such that the location assistance data includes the ambiguous cell and such that the at least one processor is configured to determine the location by the UE based on the location assistance data. The at least one processor may be further configured to receive location assistance data from the location server, such that the location assistance data includes a most likely antenna for the ambiguous cell and wherein the at least one processor is configured to determine the location by the UE based on the location assistance data. The at least one processor may be further configured to receive an LTE Positioning Protocol (LPP) Provide Assistance Data message from the location server. The at least one processor may be further configured to send an LPP Provide Location Information message to the location server. The at least one measurement for the ambiguous cell may be a measurement of a reference signal time difference (RSTD) for an Observed Time Difference of Arrival (OTDOA) position method for LTE access.

An example of a method for locating a user equipment (UE) according to the disclosure includes receiving measurement data from the UE, such that the measurement data includes at least one measurement for an ambiguous cell, such that the ambiguous cell utilizes at least one of a repeater, a remote radio head, a relay, a distributed antenna system or a positioning reference signal identical to that of another nearby cell, and calculating a current position of the UE based at least in part on the at least one measurement for the ambiguous cell.

Implementations of such a method may include one or more of the following features. Location assistance data may be provided to the UE, such that the location assistance data includes the ambiguous cell, a request for the measurement data may be provided to the UE. The UE may be configured to access a Long Term Evolution (LTE) network and the at least one measurement for the ambiguous cell is a reference signal time difference (RSTD) measurement for an Observed Time Difference of Arrival (OTDOA) position method. The ambiguous cell may be a reference cell. The ambiguous cell may be a neighbor cell. Providing the location assistance data to the UE may include sending an LTE Positioning Protocol (LPP) Provide Assistance Data message to the UE. Receiving the measurement data from the UE may include receiving an LPP Provide Location Information message from the UE. Calculating the current position of the UE may be based on almanac data for the ambiguous cell.

An example method for locating a User Equipment (UE) according the disclosure includes making measurements for a plurality of cells such that at least one measurement is for an ambiguous cell, such that the ambiguous cell utilizes one of a repeater, a remote radio head, a relay, a distributed antenna system or a positioning reference signal identical to that of another nearby cell, and enabling determination of a location for the UE based at least in part on the at least one measurement for the ambiguous cell.

Implementations of such a method may include one or more of the following features. Enabling determination of the location for the UE may include sending the measurements for the plurality of cells to a location server. Location assistance data may be received from the location server, such that the location assistance data may include the ambiguous cell, and a request for the measurements may be received from the location server, such that the sending the measurements for the plurality of cells to the location server is in response to the request. Enabling determination of the location for the UE may include determining the location by the UE. Location assistance data may be received from a location server, such that the location assistance data includes the ambiguous cell and such that the determining the location by the UE is based on the location assistance data. Receiving the location assistance data from the location server may include receiving an LTE Positioning Protocol (LPP) Provide Assistance Data message from the location server. Sending the measurements for the plurality of cells to the location server may include sending an LPP Provide Location Information message to the location server. The at least one measurement for the ambiguous cell may be a measurement of a reference signal time difference (RSTD) for an Observed Time Difference of Arrival (OTDOA) position method for LTE access. The ambiguous cell may be a reference cell. The reference cell may be a neighbor cell.

An example of a computer-readable medium for locating a user equipment (UE) according to the disclosure includes code for providing location assistance data to the UE, such that the location assistance data includes at least one ambiguous cell, code for providing a request to the UE for measurement data, code for receiving measurement data from the UE, such that the measurement data includes at least one measurement for an ambiguous cell, such that the ambiguous cell utilizes at least one of a repeater, a remote radio head, a relay, a distributed antenna system or a positioning reference signal identical to that of another nearby cell, and code for calculating a current position of the UE based at least in part on the at least one measurement for the ambiguous cell.

An example of a computer-readable medium for locating a User Equipment (UE) according to the disclosure includes code for receiving location assistance data from a location server, such that the location assistance data includes an ambiguous cell, code for receiving a request for measurements from the location server, code for making one or more measurements for a plurality of cells wherein at least one measurement is for the ambiguous cell, such that the ambiguous cell utilizes one of a repeater, a remote radio head, a relay, a distributed antenna system or a positioning reference signal identical to that of another nearby cell, and code for enabling determination of a location for the UE based at least in part on the at least one measurement for the ambiguous cell.

Items and/or techniques described herein may provide one or more of the following capabilities, as well as other capabilities not mentioned. Location assistance data including ambiguous and non-ambiguous cell is provided from a location server to a UE. An ambiguous cell is associated with radio sources which broadcast (or simulcast) duplicate signals such as Distributed Antenna Systems (DAS), Remote Radio Heads (RRHs), repeaters and relays. A reference cell, or a neighboring cell, may be an ambiguous cell. The UE may determine reference signal time difference (RSTD) measurements based on the location assistance data. The UE may not be aware of which cell is an ambiguous cell. The location server, or the UE, may process the RSTD measurements to determine a current location for the UE. The current location may be based at least in part on a measurement or measurements for one or more ambiguous cells. Further, it may be possible for an effect noted above to be achieved by means other than that noted, and a noted item/technique may not necessarily yield the noted effect.

DETAILED DESCRIPTION

Figure 1:
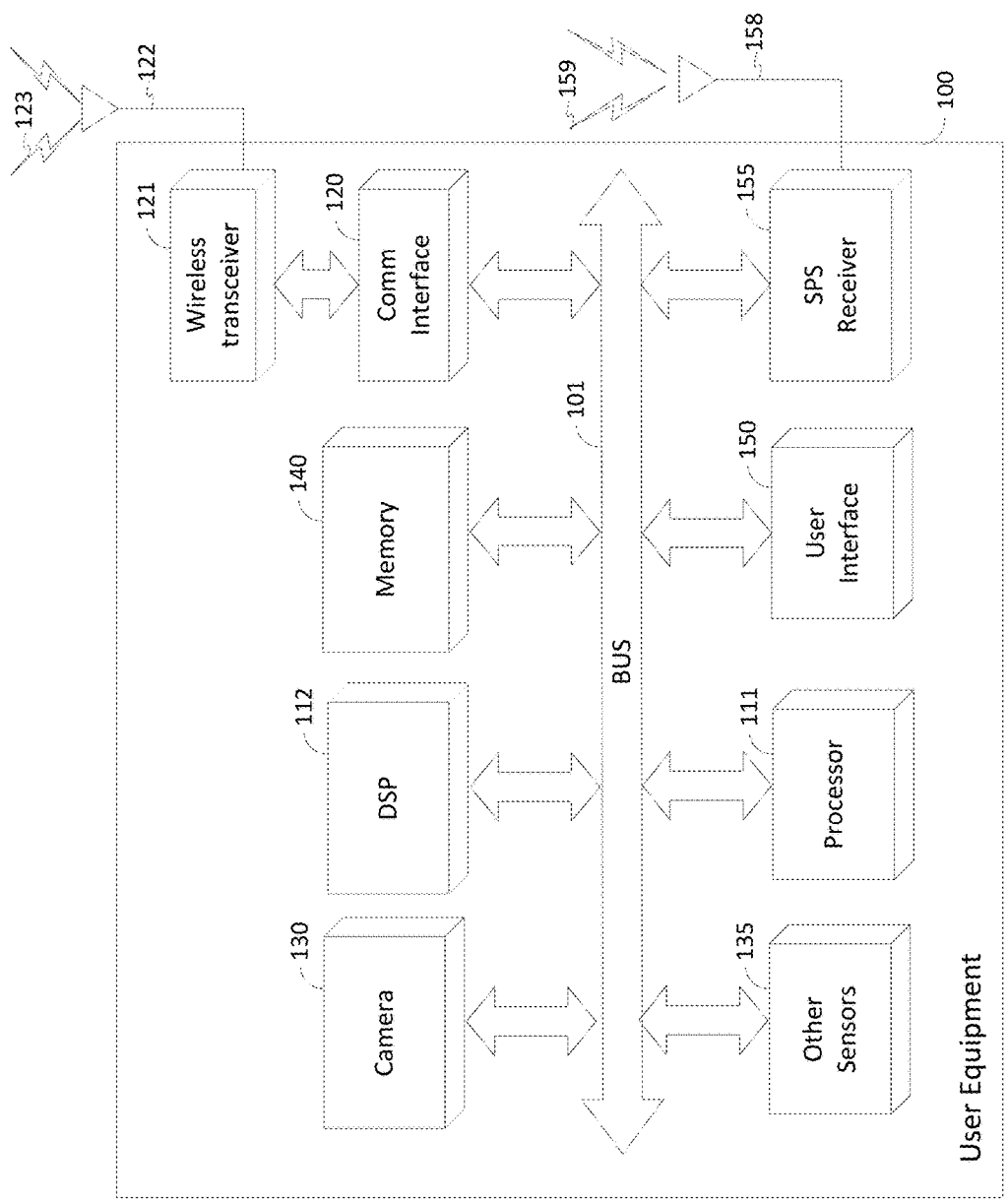
FIG. 1 is a block diagram of components of one embodiment of a user equipment.

Techniques are discussed for supporting positioning with ambiguous radio sources. A common characteristic of wireless communication networks which contain any cell C that employs a Distributed Antenna System (DAS), one or more Remote Radio Heads (RRHs), repeaters or relays, or that broadcasts the same Positioning Reference Signal (PRS) as one or more other nearby cells is that the reception of a signal (e.g. a PRS signal) transmitted by or on behalf of the cell C does not normally identify the exact source of the signal (e.g. the antenna source within the cell C). Such cells can be regarded as "ambiguous cells." OTDOA and AFLT positioning cannot normally use measurements of ambiguous cells because the signal source (e.g. DAS antenna element) cannot always be identified. This typically makes positioning less accurate and less reliable. In an example technique described herein, the OTDOA measurements themselves may be used to identify measured radio sources (e.g. a DAS antenna element or a particular RRH) in an ambiguous cell. In some cases, other location measurements may be used to identify the ambiguous radio sources. The methods may enable usage of one or more extra OTDOA measurements when calculating the position of a UE using OTDOA, AFLT or some similar position method, which may significantly increase location accuracy when strong signals are received from ambiguous cells but only weak signals are received from non-ambiguous cells.

A client device, referred to herein as a user equipment (UE), may be mobile or stationary, and may communicate with a radio access network (RAN). As used herein, the term "UE" may be referred to interchangeably as an "access terminal" or "AT", a "wireless device", a "subscriber device", a "mobile device", a "subscriber terminal", a "subscriber station", a "user terminal" or UT, a "mobile terminal", a "mobile station", a SUPL enabled terminal (SET), a target device, a target UE, a device and variations thereof. A UE may be a cell phone, smart phone, laptop, tablet, asset tag, PDA, machine to machine (M2M) device or any other device that is enabled to communicate wirelessly with other UEs and/or with other entities via direct means and/or via one or more networks or one or more network elements. Generally, UEs can communicate with a core network via a RAN, and through the core network (or sometimes through the RAN) the UEs can be connected with external networks such as the Internet. The RAN may support wireless communication from UEs using cellular based radio technologies such as GSM, UMTS and LTE as defined by 3GPP or CDMA2000 as defined by 3GPP2. A UE may also employ other mechanisms for connecting to the core network and/or the Internet such as over wired access networks, WiFi networks (e.g., based on IEEE 802.11, etc.), Bluetooth® networks and so on. UEs can be embodied by any of a number of types of devices including but not limited to PC cards, compact flash devices, external or internal modems, wireless or wireline phones, and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.).

The location of a UE may be referred to as a location estimate, position, position estimate, position fix or fix or by some other name and may comprise location coordinates such as a latitude, longitude and possibly altitude. In some cases, location coordinates may be local and may then sometimes be referred to as x, y and z (or X, Y and Z) coordinates where an x (or X) coordinate refers to a horizontal distance in a particular direction (e.g. a distance East or West of a given known origin), a y (or Y) coordinate refers to a horizontal distance at right angles to the x (or X) direction (e.g. a distance North or South of a given known origin) and a z (or Z) coordinate refers to a vertical distance (e.g. a distance above or below local ground level). When computing the location of a UE, it is common to solve for local x, y and possibly z coordinates and then, if needed, convert the local coordinates into absolute ones (e.g. for latitude, longitude and altitude above or below mean sea level).

Referring to FIG. 1, a user equipment (UE) 100 is illustrated for which various techniques herein can be utilized. The UE 100 includes a processor 111 (or processor core) and memory 140. The UE 100 may optionally include a trusted environment operably connected to the memory 140 by the public bus 101 or a private bus (not shown). The UE 100 may also include a communication interface 120 and a wireless transceiver 121 configured to send and receive wireless signals 123 via a wireless antenna 122 over a wireless network. The wireless transceiver 121 is connected to the bus 101 via the communication interface 120. Here, the UE 100 is illustrated as having a single wireless transceiver 121. However, a UE 100 can alternatively have multiple wireless transceivers 121 and/or multiple wireless antennas 122 to support multiple communication standards such as Wi-Fi, CDMA, Wideband CDMA (WCDMA), Long Term Evolution (LTE), BLUETOOTH short-range wireless communication technology, etc.

The communication interface 120 and/or wireless transceiver 121 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, control information, overhead information, data, etc.

The UE 100 may also include a user interface 150 (e.g., display, graphical user interface (GUI)), and a Satellite Positioning System (SPS) receiver 155 that receives SPS signals 159 (e.g., from SPS satellites) via an SPS antenna 158 (which may be the same antenna as wireless antenna 122 or may be different). The SPS receiver 155 can communicate with a single global navigation satellite system (GNSS) or multiple such systems. A GNSS can include, but is not limited to, Global Positioning System (GPS), Galileo, Glonass, Beidou (Compass), etc. SPS satellites are also referred to as satellites, space vehicles (SVs), etc. The SPS receiver 155 measures the SPS signals 159 and may use the measurements of the SPS signals 159 to determine the location of the UE 100. The processor 111, memory 140, Digital Signal Processor (DSP) 112 and/or specialized processor(s) (not shown) may also be utilized to process the SPS signals 159, in whole or in part, and/or to calculate the location of the UE 100, in conjunction with SPS receiver 155. Alternatively, UE 100 may support transfer of the SPS measurements to a location server (e.g. E-SMLC) that computes the UE location instead. Storage of information from the SPS signals 159 or other location signals is performed using a memory 140 or registers (not shown). While only one processor 111, one DSP 112 and one memory 140 are shown in FIG. 1, more than one of any, a pair, or all of these components could be used by the UE 100. The processor 111 and DSP 112 associated with the UE 100 are connected to the bus 101.

The memory 140 can include a non-transitory computer-readable storage medium (or media) that stores functions as one or more instructions or code. Media that can make up the memory 140 include, but are not limited to, RAM, ROM, FLASH, disc drives, etc. In general, the functions stored by the memory 140 are executed by general-purpose processor(s) 111, specialized processors, or DSP(s) 112. Thus, the memory 140 is a processor-readable memory and/or a computer-readable memory that stores software (programming code, instructions, etc.) configured to cause the processor(s) 111 and/or DSP(s) 112 to perform the functions described. Alternatively, one or more functions of the UE 100 may be performed in whole or in part in hardware.

A UE 100 can estimate its current position within an associated system using various techniques, based on other communication entities within view and/or information available to the UE 100. For instance, a UE 100 can estimate its position using information obtained from access points (APs) associated with one or more wireless local area networks (WLANs), personal area networks (PANs) utilizing a short-range wireless communication technology such as BLUETOOTH or ZIGBEE®, etc., Global Navigation Satellite System (GNSS) or other Satellite Positioning System (SPS) satellites, and/or map data obtained from a map server or other server (e.g. an E-SMLC or SLP). In some cases, a location server, which may be an E-SMLC, SLP or Standalone Serving Mobile Location Center (SAS), may provide assistance data to a UE 100 to enable or assist the UE 100 to acquire signals (e.g. signals from WLAN APs, cellular base stations, GNSS satellites) and make location related measurements using these signals. The UE 100 may then provide the measurements to the location server to compute a location estimate (which may be known as "UE assisted" positioning) or may compute a location estimate itself (which may be known as "UE based" positioning) based on the measurements and possibly based also on other assistance data provided by the location server (e.g. such as orbital and timing data for GNSS satellites or the precise location coordinates of WLAN APs and/or cellular base stations for use in OTDOA and AFLT positioning).

In one embodiment, the UE 100 may include a camera 130 (e.g., front and/or back facing) such as, for example, complementary metal-oxide-semiconductor (CMOS) image sensors with appropriate lens configurations. Other imaging technologies such as charge-coupled devices (CCD) and back side illuminated CMOS may be used. The camera 130 may be configured to obtain and provide image information to assist in positioning of the UE 100. In an example, one or more external image processing servers (e.g. remote servers) may be used to perform image recognition and provide location estimation processes. The UE 100 may include other sensors 135 which may also be used to compute, or used to assist in computing, a location for the UE 100. Sensors 135 may include inertial sensors (e.g. accelerometers, gyroscopes, magnetometers, compass) as well as a barometer, thermometer, hygrometer and other sensors.

Figure 2:
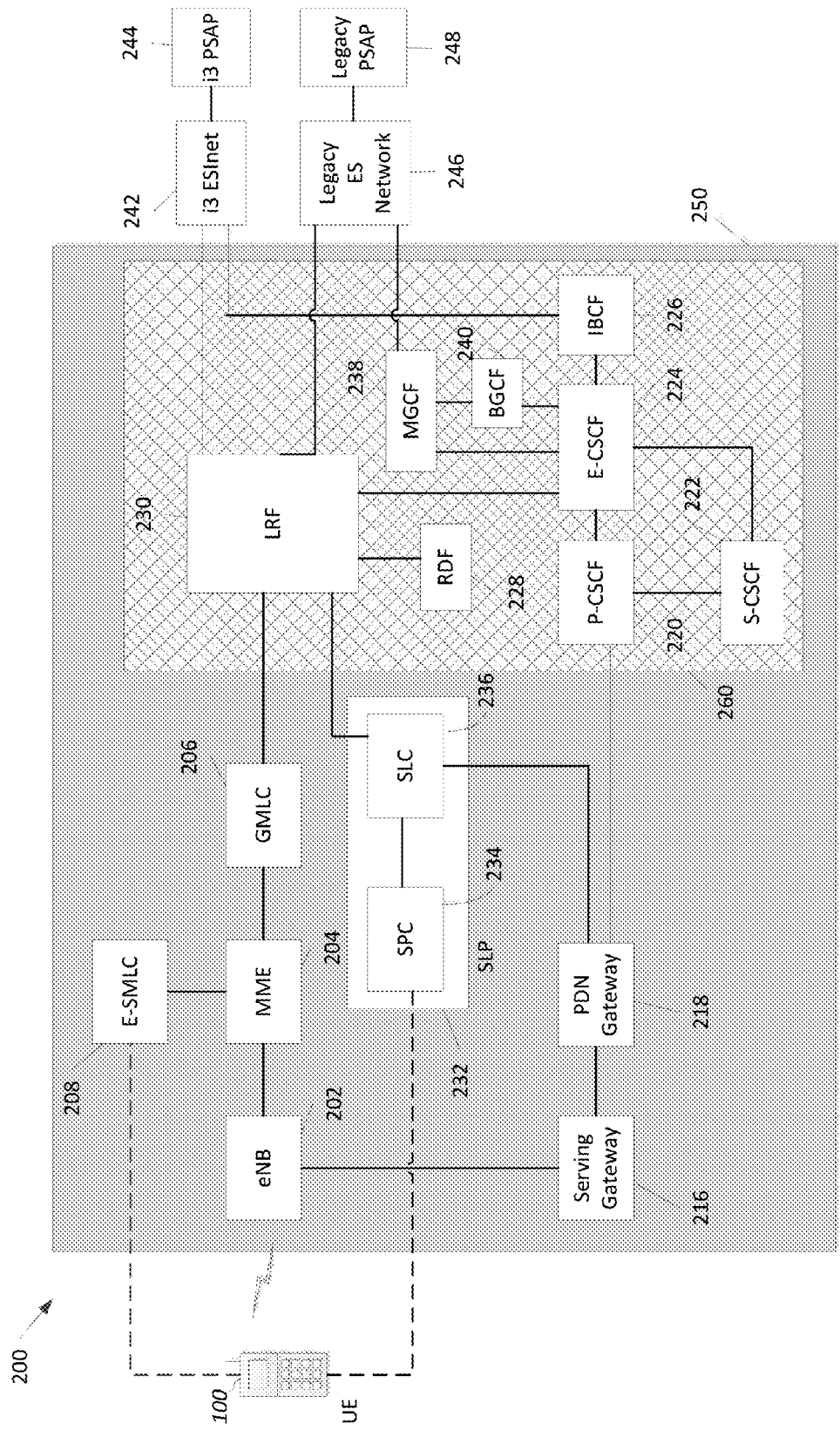
FIG. 2 is an example architecture for terrestrial positioning with 3GPP long term evolution (LTE) access.

Referring to FIG. 2, with further reference to FIG. 1, an architecture 200 for supporting positioning of a UE 100 with 3GPP Long Term Evolution (LTE) access for a network 250 is shown. The network 250 may be an Evolved Packet System (EPS) that supports LTE access (e.g. by the UE 100) and possibly other access types (not shown in FIG. 2) such as CDMA2000, Wideband CDMA (WCDMA) and/or WiFi. A UE 100 may communicate with a serving evolved Node B (eNodeB or eNB) 202 in a radio access network (RAN) to obtain communication services from the network 250. The RAN may include other network entities not shown in FIG. 2 for simplicity and may also be referred to as an Evolved Universal Terrestrial Radio Access Network (E-UTRAN). The eNB 202 may also be referred to as a Node B, a base station, an access point, etc. The terms "access point" and "base station" are used interchangeably herein. The UE 100 may (i) receive signals from eNB 202 and from other base stations (e.g. other eNBs) and APs in network 250; (ii) obtain the identities of the source eNBs and other base stations and/or obtain the identities of the source cells from the received signals and/or (iii) obtain measurements of the received signals such as measurements of time of arrival (TOA), reference signal time difference (RSTD) for OTDOA positioning, pilot phase for AFLT positioning, and/or signal strength (e.g. received signal strength indication (RSSI)), signal quality (e.g. signal to noise ratio (S/N)), and/or signal round trip propagation time (RTT) for enhanced cell ID (ECID) positioning. The eNB identities, base station identities and/or cell identities and the different signal measurements may be used to derive a location estimate for UE 100 (e.g. by UE 100 or by a location server such as E-SMLC 208 or SLP 232). While only one eNB 202 is depicted in FIG. 2, the architecture 200 (e.g. network 250) may include multiple eNBs and/or other base stations and/or APs, each with one or more antenna systems such as used with Distributed Antenna Systems (DAS), Remote Radio Heads (RRHs), repeaters and relays.

The eNB 202 may communicate with a serving MME 204 for UE 100, which may perform various control functions such as mobility management, PDN gateway selection, authentication, bearer management, etc. MME 204 may communicate with an Enhanced Serving Mobile Location Center (E-SMLC) 208 and a Gateway Mobile Location Center (GMLC) 206. The E-SMLC 208 may support UE-based, UE-assisted, network-based and/or network-assisted positioning methods for UEs including UE 100 and may support one or more MMEs. E-SMLC 208 may support the 3GPP control plane location solution for LTE access as defined in 3GPP Technical Specifications (TSs) 23.271 and 36.305. The E-SMLC 208 may also be referred to as a location server (LS), a Stand Alone SMLC (SAS), etc. The GMLC 206 may perform various functions to support location services and provide services such as subscriber privacy, authorization, authentication, billing, etc. A Location Retrieval Function (LRF) 230 may communicate with GMLC 206 and may route or help route IP-based emergency calls to a Public Safety Answering Points (PSAPs) such as the i3 ESInet 242 and i3 PSAP 244, and well as legacy systems such as the legacy Emergency Services (ES) network 246 and the legacy PSAP 248. LRF 230 may also support location requests from PSAPs (e.g. PSAPs 244 and 248) for UEs (e.g. UE 100) that are making emergency calls and may obtain locations for these UEs and return the locations to the requesting PSAPs. In order to support the routing and location functions that LRF 230 performs, LRF 230 may be configured to request the locations of different target UEs (e.g. UE 100) from a GMLC such as GMLC 206. In that case, GMLC 206 may transfer any location request for a target UE (e.g. UE 100) to an MME such as MME 204 which may transfer the request to an E-SMLC such as E-SMLC 208. The E-SMLC (e.g. E-SMLC 208) may then obtain location related measurements for the target UE (e.g. UE 100) from the serving eNB for the target UE (e.g. eNB 202) and/or from the target UE, compute or verify any location estimate for the target UE and return the location estimate via the MME and GMLC (e.g. MME 204 and GMLC 206) to LRF 230. LRF 230 may also or instead be configured to request the locations of different target UEs (e.g. UE 100) from a SUPL Location Platform (SLP) such as SLP 232 described next. SLP 232 may include a SUPL Positioning Center (SPC) 234 and a SUPL Location Center (SLC) 236, and may be configured to communicate location information with the LRF 230 and support the SUPL user plane location solution defined by the Open Mobile Alliance (OMA) in order to obtain the locations of UEs such as UE 100.

In order to support positioning of a UE such as UE 100, E-SMLC 208 and SLP 232 may each use the LTE Positioning Protocol (LPP) defined in 3GPP TS 36.355 and/or the LPP Extensions (LPPe) protocol defined by OMA in which LPP and/or LPPe messages are exchanged between E-SMLC 208 or SLP 232 and the target UE (e.g. UE 100) that is being positioned. In the case of E-SMLC 208, LPP and/or LPPe messages exchanged with a target UE may be transferred as signaling via the serving MME and serving eNB for the target UE (e.g. eNB 202 and MME 204 if the target UE is UE 100). In the case of SLP 232, LPP and/or LPPe messages exchanged with a target UE may be transferred as data using IP transport via a PDN Gateway, Serving Gateway and serving eNB for the target UE (e.g. PDN Gateway 218, Serving Gateway 216 both described next and eNB 202 if the target UE is UE 100). An LPP message that is combined with an LPPe message (e.g. with the LPPe message embedded inside the LPP message) may be referred to as LPP/LPPe message. Similarly, the combination of the LPP and LPPe protocols (e.g. as supported by exchanging LPP/LPPe messages between the UE 100 and E-SMLC 208 or SLP 232) may be referred to as an LPP/LPPe protocol.

A Serving Gateway 216 may perform various functions related to IP data transfer for UEs such as data routing and forwarding, mobility anchoring, etc. A Packet Data Network (PDN) Gateway 218 may perform various functions such as maintenance of data connectivity for UEs, IP address allocation, support of access to external data networks and/or a data intranet for network 250 etc. An IP Multimedia Subsystem (IMS) 260 for network 250 may include various network entities to support IMS services such as Voice-over-IP (VoIP) calls and VoIP emergency calls. The IMS 260 may include a Proxy Call Session Control Function (P-CSCF) 220, a Serving Call Session Control Function (S-CSCF) 222, an Emergency Call Session Control Function (E-CSCF) 224, a Breakout Gateway Control Function 240, a Media Gateway Control Function (MGCF) 238, an Interconnection Border Control Function (IBCF) 226, a Routing Determination Function (RDF) 228 and the LRF 230.

In operation, the network 250 may utilize LTE interfaces and protocols for control plane location. The LPP protocol, either alone or combined with the LPPe protocol, may be used over the Uu interface between the UE 100 and the eNB 202 for positioning of the UE 100 by the E-SMLC 208. LPP or LPP/LPPe messages may be transferred (as previously described) between the UE 100 and the E-SMLC 208 via the MME 204 and the eNB 202 for the UE 100 as described in 3GPP TSs 23.271 and 36.305. The E-SMLC 208 may be configured to request (e.g. by sending an LPP/LPPe Request Location Information message to UE 100), and the UE 100 may be configured to provide (e.g. by sending an LPP/LPPe Provide Location Information message to E-SMLC 208) the signal measurements (e.g. RSSI, RTT, RSTD measurements) and identities of visible cells.

In an alternative embodiment, either (i) the LPP protocol alone without LPPe or (ii) the RRC protocol defined in 3GPP 36.331 may be used over the Uu interface between the UE 100 and the serving eNB 202 for positioning of the UE 100 by the E-SMLC 208. In the case of LPP (alternative (i)), LPP messages (without LPPe messages) may be transferred between the UE 100 and the E-SMLC 208 via the MME 204 and the serving eNB 202 for the UE 100 as described in 3GPP TSs 23.271 and 36.305. In the case of RRC (alternative (ii)), RRC messages may be transferred between the UE 100 and the serving eNB 202 and LTE Positioning Protocol A (LPPa) messages (defined in 3GPP TS 36.455) may be transferred between eNB 202 and E-SMLC 208 via the MME 204 for the UE 100 as described in 3GPP TSs 23.271 and 36.305. In an example, the E-SMLC 208 may be configured to request (e.g. by sending an LPP Request Location Information message to UE 100 or an LPPa request message to eNB 202 which may cause eNB 202 to send an RRC request message to UE 100), and the UE 100 may be configured to provide (e.g. by sending an LPP Provide Location Information message to E-SMLC 208 or an RRC response to eNB 202 which causes eNB 202 to send an LPPa response to E-SMLC 208) the signal measurements (e.g., RSTD measurements) and identities of visible cells.

A Location Services (LCS) Application Protocol (LCS-AP) defined in 3GPP TS 29.171 may be used over an SLs interface between the MME 204 and the E-SMLC 208 to enable the MME 204 to request location information for the UE 100 from the E-SMLC 208 using the 3GPP control plane solution. An Evolved Packet Core (EPC) LCS Protocol (ELP) defined in 3GPP TS 29.172 may be used over an SLg interface between the MME 204 and the GMLC 206 to enable the GMLC 206 to request and obtain location information for the UE 100 from MME 204 using the 3GPP control plane solution.

The network 250 may also utilize interfaces and protocols for SUPL User Plane Location. A Lup interface as defined in OMA-AD-SUPL-V2_0 may be used between the UE 100 (referred to as a SUPL Enabled Terminal (SET)) and the SLP 232 to support positioning of the UE 100 using the OMA SUPL user plane solution. The Lup interface enables exchange of UserPlane Location Protocol (ULP) messages, defined in OMA-TS-ULP-V2_0_3, between the UE 100 and the SLP 232. The SLP 232 may be a Home SLP (H-SLP) and reside in the home network of a UE (e.g. applicable to UE 100 if network 250 is the home network for UE 100) or may be a Discovered SLP (D-SLP) or Emergency SLP (E-SLP). A D-SLP may be used to position UE 100 in any network (e.g. applicable if network 250 is not the home network for UE 100) and an E-SLP may be used to position UE 100 if UE 100 is establishing or has established an emergency call (e.g. a VoIP emergency call via IMS 260 to i3 PSAP 244 or legacy PSAP 248). SLP 232 is split into the SLC 236 and the SPC 234 which may be separate logical functions of a single physical SLP 232 or separate physical entities. The SLC 236 is configured to establish and control a SUPL session with the UE 100. The SPC 234 is configured to obtain a location of the UE 100. The endpoint for any ULP message is then either the SLC 236 or the SPC 234 depending on whether the ULP message is used for control and service provision or for positioning. In the case of the UE 100 (e.g., with LTE access), the ULP messages used for positioning typically each encapsulate one or more LPP messages. Each encapsulated LPP message can further encapsulate one LPPe message, thereby enabling exchange of LPP and/or LPP/LPPe positioning protocol messages between UE 100 and SLP 232 as previously described. To support accurate location, LPP/LPPe may be used to enable the SPC 234 to request, and the UE 100 to return the same information (e.g. cell identities and RSTD measurements) as described for control plane location described above.

A difficult problem up until now and as previously mentioned herein has been how to make use of duplicated signals from different radio sources to perform OTDOA (or AFLT) positioning of a UE in the case that the radio sources are limited to broadcasting identical (duplicate) versions of the same RF signal (e.g. without any unique identification such as watermarking or inclusion of other distinct signal content that would allow a UE to identify or distinguish the source of each duplicate signal). When OTDOA or AFLT positioning is attempted in an area where a UE can receive duplicate signals from multiple radio sources, any signal measurements made by the UE of such signals typically have to be discarded when the location of the UE is determined because neither the UE nor the network can usually know which radio source was the source of the signal that was measured. Not knowing the source of a measured signal means that the location of the source is not known and hence location determination methods (such as multilateration or trilateration) that rely on knowing the locations of the measured signal sources cannot be used. This can be a significant disadvantage because broadcasting a duplicate signal from multiple radio sources is often used by operators to extend network coverage in confined areas such as buildings, subways, sports stadiums, airports etc. more economically than deploying separate base stations, separate APs or separate small cells that each broadcast different (non-duplicate) signals. It should be noted that some positioning methods such as RF fingerprinting, where a location server knows certain characteristics (e.g. RSSI, RTT and/or S/N) of received signals from different cells at a number of nearby locations and attempts to locate a UE by matching UE measurements of these signal characteristics to the known signal characteristics, may work in the presence of duplicated radio signals but may not always be accurate.

The transmission of identical radio signals within the same cell by antennas at different locations within the cell is sometimes referred to as "simulcast". Examples of radio sources that can broadcast (or simulcast) duplicate signals include a Distributed Antenna System (DAS), Remote Radio Heads (RRHs), repeaters and relays. With a DAS, a single base station transmits and receives signals via a number of separate low power antenna elements which may be connected to the base station via splitters, feeders (e.g. coax cable) and possibly repeater amplifiers. With RRHs, a single base station may have a collocated main antenna and a number of separate remote radio heads (RRHs) which each comprise a separate radio transceiver, with its own antenna, that is connected to the main base station by wireless or wireline means (e.g. using fiber optic cable). With a repeater or relay, radio signals broadcast by a main base station are received by the repeater or relay, amplified and re-broadcast and signals received by the repeater or relay from cellular devices may be amplified and re-broadcast to the base station. Typically, signals sent by the different antenna elements in a DAS are identical copies of one another. In the case of RRHs, the signals may be identical or the base station may introduce differences that would allow a UE to determine the source RRH. In the case of relays and repeaters, the signals may be identical or the relay or repeater may introduce differences. The positioning problem for OTDOA (and AFLT) normally arises when identical (i.e. duplicate) positioning reference signals (PRSs) are broadcast (or simulcast) by at least two different radio sources. Thus, the problem may also happen when two different cells broadcast the same PRS (e.g. using the same frequency, same PRS code and same PRS positioning occasions) due to poor (e.g. erroneous) network planning even though other signal content broadcast by the two cells including their cell identities may differ.

A common characteristic of cells that employ a DAS, RRHs, repeaters or relays or where two cells broadcast the same PRS signal is that reception of a signal (e.g. a PRS signal) in the cell does not by itself identify the source of the signal (e.g. the antenna source or the cell source). Therefore, such cells are referred to herein as "ambiguous cells". It is shown later that an ambiguous cell can also include a cell that uses only one antenna and whose PRS is not duplicated by other cells but where the location of the cell antenna is unknown.

Techniques described herein to overcome the signal duplication problem for OTDOA positioning make use of the fact that typically a UE will not move by much if at all while being positioned since positioning using OTDOA typically occupies less than 20 seconds of signal measurement time. Therefore, in some cases when the signal sources of a duplicated signal are not too close together, a UE may receive and measure signals from only one source of a duplicated signal (e.g. one DAS antenna element or one RRH) and not from more than one source of the duplicated signal for the duration of the measurements. In other cases when identical signals are being broadcast (or simulcast) by a number of radio sources, a UE may receive signals from more than one radio source and may also receive additional signals from some radio sources due to multipath effects where a signal from the same radio source is reflected by walls, buildings and other objects and arrives at the UE along two or more different paths at different times. A normal implementation in the case of receiving multipath signals from a single source is for a UE to make measurements only of the earliest received signal on the basis that this will be a signal either on a direct line of sight (LOS) to the transmitting antenna or at least will be the signal with minimum multipath. The same principle can be applied to measurements involving multiple sources of a duplicate signal. Again, the earliest received signal can be measured by a UE which may be from the radio source closest to the UE or from a more distant radio source depending on received signal strengths, multipath conditions and propagation delays inside the network from the original source of the duplicate signal (e.g. a base station) to the UE. For the radio source measured by a UE, the measured signal will either be LOS or will be the signal from this radio source with enough strength to be measured that has minimum multipath delay. Then, as long as signal conditions remain constant over the period of measurements (e.g. no fading or movement of the UE to another location), the UE will be able to measure signals from the same radio source (i.e. only one radio source)—although neither the UE nor network may know which source this is.

A UE can then make multiple measurements involving the same radio source—e.g. by using the cell associated with the radio source as the reference cell for OTDOA. For example, if the serving cell for the UE uses a DAS, RRHs or repeaters, a location server can assign this cell as the reference cell because it will normally have good signal strength at the location of the UE. A location server can then receive OTDOA measurements from the UE that comprise measurements of reference signal time differences (RSTDs). As defined in 3GPP TS 36.214, an RSTD measurement equals the difference between the signal (e.g. PRS) time of arrival (TOA) from the reference cell at the UE and the signal TOA from any neighbor cell at the UE, where the signals refer to the start of an LTE subframe for each cell with the subframes being those that are closest together in time. When the reference cell is an ambiguous cell, the UE may make RSTD measurements for a particular reference antenna R for the reference cell (e.g. where R is a DAS antenna element or an RRH). It is shown later that although the reference antenna R is initially unknown, this only introduces one additional variable B into the equations that may be used to determine the position of the UE from the RSTD measurements. As shown later, the variable B relates the RSTD measurements performed by the UE to the known locations of the antennas for the neighbor cells and any additional signal propagation times inside the network to the neighbor cell antennas that may be needed due to synchronizing PRS transmission for each cell.

As one reason for having just one additional variable (e.g. B as referred to above) in the equations used to determine a location of the UE in the case that the reference cell for OTDOA is an ambiguous cell, the location server (e.g. an E-SMLC or SLP) could assume that the UE is measuring PRS signals for one particular reference antenna R* for the reference cell. The reference antenna R* may correspond to a particular antenna element in a DAS, an antenna for a particular RRH, an antenna for a repeater or relay or the main collocated antenna for a base station, depending on the type of radio signal duplication being used within the ambiguous cell. Typically, the reference antenna R* assumed by the location server will not be the reference antenna R whose signals are measured by the UE (though in some cases it may be). This will introduce an unknown bias B* into each of the RSTD measurements made by the UE equal to the difference between the TOA for the reference antenna R measured by the UE and the TOA that would have been measured by the UE for the reference antenna R* assumed by the location server (in the case that UE measures R* and not R). This TOA difference will be constant if the UE location and signal propagation conditions remain the same during the period of OTDOA measurements. This may allow the location server to include one additional variable, equal to the unknown bias B*, into the equations that relate the UE location coordinates to the RSTD measurements. Alternatively, and as shown later equivalently, the location server can include the variable B referred to above in the equations instead of B*. If the base station transmissions are accurately synchronized to a common time (e.g. GPS time) and if the location server knows the signal propagation times as far as the antennas, then 3 or 4 variables would need to be solved for—the x, y and possibly z coordinates of the UE and the unknown RSTD bias B* or variable B. A solution would then be possible using 4 independent RSTD measurements.

Having calculated the estimated location L of the UE and the bias B* or variable B, the location server may in some cases be able to determine the reference antenna R that the UE was measuring by calculating the expected bias B* or variable B at the calculated location L for the UE for each possible reference antenna associated with the reference cell and finding the reference antenna for which the expected value of B* or B is closest to that calculated from the RSTD measurements. For example in the case of B*, in a network in which measured OTDOA signals such as Positioning Reference Signals (PRSs) are synchronized at some set of synchronization points along the transmission paths for the various signals (e.g. at the antennas or at the start of the different transmission feeds from the base station to the various remote radio sources), the expected bias B* will equal the difference in signal propagation delay to the estimated location L from the synchronization point for the assumed reference antenna versus from the synchronization point for any other potential reference antenna. If there is one expected bias B* calculated this way that is much closer to the bias B* calculated from the RSTD measurements, it may be assumed that the reference antenna to which it applies is the measured reference antenna R. Note that if the reference antenna R* assumed by the location server was also the one measured, then the expected bias B* (for this antenna) will be exactly zero and the calculated bias B* should be close to zero. The location server can then repeat the OTDOA location computation for the UE using the measured reference antenna R for the reference cell and with no bias B* or variable B included. This may produce a more accurate location for the UE because an extra variable (B or B*) is no longer being solved for and the correct reference antenna may be used in the computation.

The reference antenna R that the UE is measuring may also be determined from other positioning methods—e.g. GPS, enhanced cell ID (ECID) and/or OTDOA without the use of measurements for ambiguous cells. For example, the location server may determine an approximate location for the UE using ECID, GPS (e.g. if GPS signal conditions do not permit an accurate GPS location) and/or OTDOA but not include any measurements of ambiguous cells. If a UE is being served by an ambiguous cell (or if the UE may be in the coverage area of an ambiguous cell even if not being served by it), the location server may determine the radio source for this cell (or the cell itself if several cells use the same PRS) that is most likely to be the one that would be measured by the UE in one of two ways. In one way, the location server may assume the radio source (or cell) will be the one whose signals will arrive earliest at the approximate location of the UE (since the UE is required to measure the earliest duplicate signal copy when multiple duplicate signal copies are received). In calculating which signals will arrive first at the approximate UE location, a location server may need to take into account signal propagation delay on the transmission feed to each antenna or antenna element (e.g. as exemplified in FIG. 3 later) as well as propagation delay from an antenna or antenna element to the approximate UE location. Alternatively, if the radio sources (or cells) are widely separated such that typically a UE will only receive and be able to measure signals from the closest radio source (or cell), the location server can determine the closest radio source (or cell) to the approximate UE location. In some cases, the two radio sources (or cells) determined using these two alternative methods may be the same in which case, the reliability of assuming this radio source will be higher. The location server can then request that the UE perform OTDOA measurements using the ambiguous cell as the reference cell. Even if the UE changes the reference cell to another cell and only provides one OTDOA RSTD measurement involving the ambiguous cell, the measurement may be useful if the location server had correctly identified the radio source (or cell) that the UE has measured for the ambiguous cell. The location server can also assist the UE to measure the assumed radio source (or cell) by providing the UE with an expected RSTD between this radio source (or cell) and each of the neighbor cells for which RSTD measurements are needed. The location server can also later check (based on the RSTD measurements from the UE) whether the assumed radio source was the one measured by the UE by using the techniques described above and further down.

Figure 3:
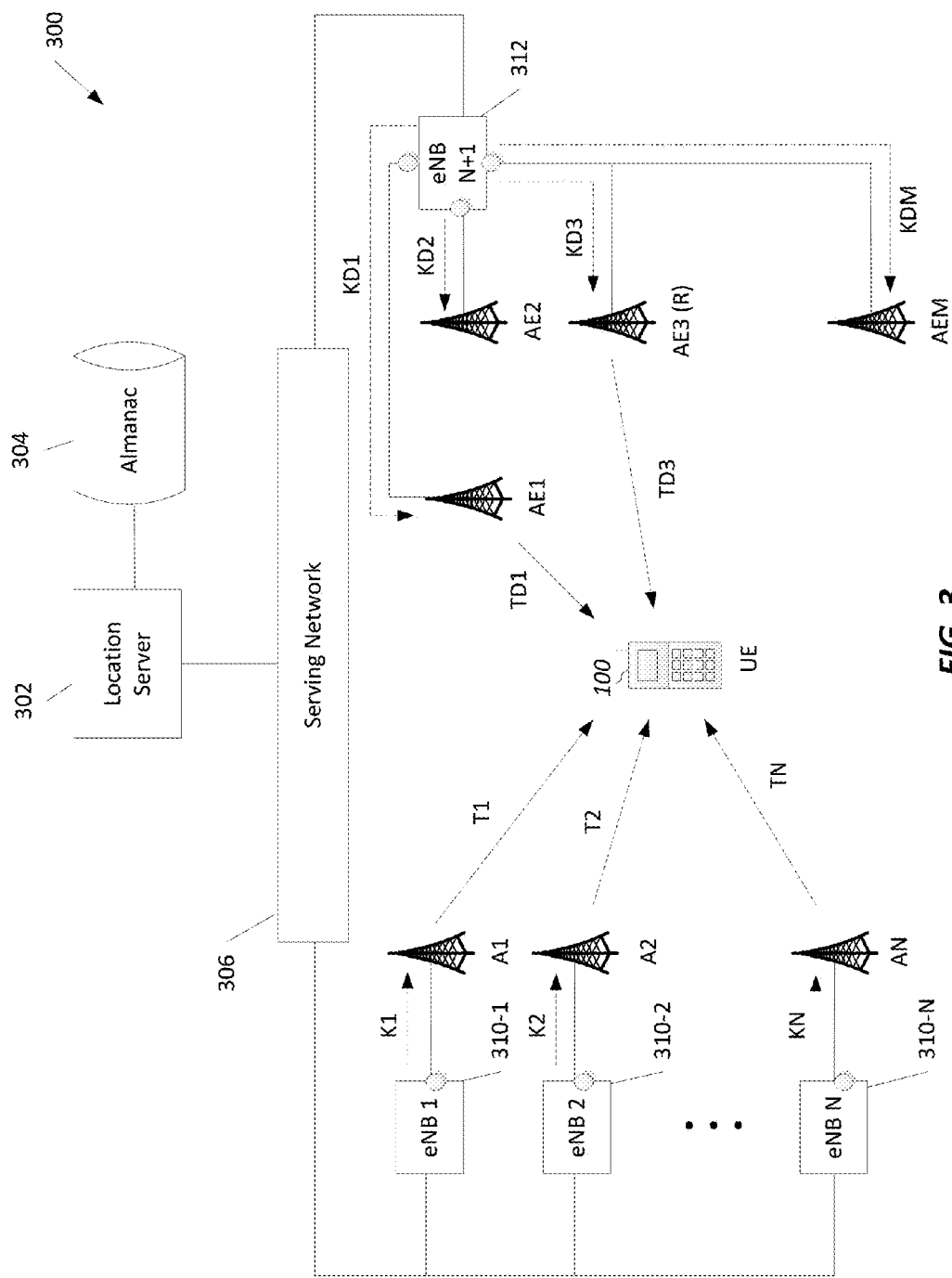
FIG. 3 is a high level architecture of an example wireless communication network for support positioning using ambiguous cells.

An example of the method is shown in FIG. 3 for a wireless communication system 300 employing LTE access and synchronized signal transmission (e.g. synchronized PRS transmission). The wireless communication system 300 includes a location server 302 and an almanac 304. The location server 302 and almanac 304 may be included as part of a serving network 306 or may be attached to or reachable from a serving network 306. For example, the serving network 306 may correspond to network 250 in FIG. 2, and the location server 302 may correspond to E-SMLC 208 or to SLP 232 in network 250 or may be another location server such as a Standalone Serving Mobile Location Center (SAS). The serving network 306 may include one or more access points and/or base stations such as eNB 1 310-1, eNB 2 310-2, eNB N, 310-N, and eNB N+1 312. There may be other eNBs not explicitly shown in FIG. 3 such as eNBs n 310-n with n between 3 and N−1. Any one of the access points (e.g. eNB N+1 312) may correspond to eNB 202 in FIG. 2. Each of the access points may be operably connected to one or more antennas which, in the case of eNB N+1 312, may be antenna elements. The antennas comprise A1, A2, . . . AN in the case of eNBs 1, 2 . . . N, respectively, and AE1, AE2, AEM, in the case of eNB N+1. An almanac 304 represents a database structure which may belong to serving network 306 and/or to location server 302 and may, in some embodiments, be part of location server 302 (e.g. contained in memory in location server 302). Almanac 304 is configured to store identification, location and other information for the access points and base stations (e.g. eNBs) and antennas within the serving network 306 and may comprise a BSA of the type previously described here.

With synchronized signal transmission, the serving network 306 can employ a set of synchronization points (exemplified by the small circles in FIG. 3), one for each antenna A1, A2, AN, or one for each, or several, of antenna elements AE1, AE2, AE3(R), AEM. Each synchronization point corresponds to a location along the signal transmission path for the signals transmitted by one antenna (or several antennas in the case of eNB N+1) at which the signal timing is synchronized exactly or almost exactly to a common time (e.g. using GPS receivers) that is applicable to all the synchronization points. For example, in the case of LTE, the synchronization points can synchronize the start of each new set of 1024 LTE downlink system frames, the start of each 10 millisecond (ms) LTE downlink radio frame or just the start of each new 1 ms LTE downlink subframe to the same time (e.g. same global time) for each cell (e.g. the cells associated with eNBs 1 to N in FIG. 3) and for each radio antenna in each cell (e.g. the cell associated with eNB N+1 in FIG. 3) when a cell uses multiple radio antennas (e.g. DAS antenna elements or RRHs) to broadcast duplicates of the same signal. A synchronization point may correspond to signal transmission at an antenna or to signal propagation past some point prior to reaching the antenna such as a signal output jack from an eNB or an intermediate signal amplifier.

FIG. 3 shows N eNBs 310-1, 310-2, 310-N labelled 1 to N that each support a single cell using a single antenna labelled A1, A2 to AN. An eNB N+1 312 also associated with a single cell is shown that uses a DAS with M separate antenna elements labelled AE1, AE2, AE3(R) to AEM. Although a DAS is shown, it will be appreciated that the example applies just a well to the case of an eNB N+1 312 supporting a cell containing M RRHs, M repeaters, M relays or some combination of M DAS antenna elements, RRHs, repeaters and relays. The example also applies to M separate cells (with M separate eNBs replacing eNB N+1 in FIG. 3) with antennas AE1 to AEM that broadcast the same PRS. In the example in FIG. 3, the location server 302 instructs the UE 100 to perform OTDOA measurements using the DAS cell for eNB N+1 312 as reference cell and the cells for eNBs 310-1, 310-2, 310-N as neighbor cells and to return the OTDOA RSTD measurements to the location server 302. In this example, the antenna element measured by the UE 100 (corresponding to the measured reference antenna R described above) may be any antenna element AEm (e.g. an example where m equals 3 is shown in FIG. 3). The LOS signal propagation times from each antenna to the UE 100 are Tn for each eNB antenna An and TDm for each DAS antenna element AEm. The UE 100 may then measure up to N RSTDs between the reference cell for eNB N+1 312 and each of the N neighbor cells for eNBs 1 to N (e.g., 310-1, 310-2, 310-N). The N RSTDs (if measured correctly and if there is no multipath) will be related to the signal propagation delays from the different antennas to the UE 100 and to the signal propagation delays inside the network to the different antennas by the following equation (which can be inferred from the arrangement shown in FIG. 3):

$$\text{RSTD}n = (Tn + Kn) - (TDm + KDm)(1 \leq n \leq N) \quad (1)$$

Here antenna element AEm is assumed to be measured by the UE for eNB N+1 and RSTDn is the RSTD between antenna element AEm (which is assumed to remain fixed) and antenna An for each neighbor eNB n. Kn is the added internal signal propagation delay for antenna An from the point of network signal synchronization for antenna An to the antenna An (e.g. including propagation along any transmission feeds, signal amplifiers and other elements in the transmission path to antenna An). If the synchronization point for antenna An is antenna An, then Kn is zero. Typically, Kn will be constant and can be measured and/or calculated by the operator for serving network 306. Similarly, KDm is the added internal signal propagation delay for antenna element AEm from the point of network signal synchronization for antenna element AEm to the antenna element AEm. In the case of a DAS, the network synchronization point would normally occur at or near the eNB N+1 312 and KDm would thus normally include propagation delay along the transmission feed to each antenna element AEm. KDm will also normally be constant and capable of being measured and/or calculated by a network operator. For a network in which OTDOA (e.g. PRS) signals are not synchronized but where transmission time differences between different antennas can be measured or calculated, the parameters Kn and KDm can represent the difference in transmission time from each antenna An and each antenna element AEm and some universal time like UTC time or GPS time.

In order to solve for the X,Y,Z coordinates of the UE (e.g. with X being a latitude, Y a longitude and Z an altitude or X,Y,Z being local Cartesian coordinates), the following equations can be used:

$$[(Xn-x)^2 + (Yn-y)^2 + (Zn-z)^2]^{1/2} - [(xm-x)^2 + (ym-y)^2 + (zm-z)^2]^{1/2} = c(Tn - TDm)(1 \leq n \leq N) \quad (2)$$

Where:
c=signal propagation speed over the air interface (i.e. light speed);
Xn, Yn, Zn=X,Y,Z coordinates of antenna An ($1 \leq n \leq N$);
xm, ym, zm=X,Y,Z coordinates of antenna element AEm;
x, y, z=X,Y,Z coordinates of the UE.

Equation (2) applies for all N neighbor antennas An and is based only on geometry. If the measured antenna element AEm is known, the terms (Tn−TDm) in equation (2) can be obtained from the RSTD measurements using equation (1) and hence 3 RSTD measurements for 3 neighbor eNB antennas would be enough to solve for x,y,z (assuming the antenna coordinates and the propagation delay constants Kn and KDm are known). When the measured antenna element AEm is not known, equations (1) and (2) can be combined to give:

$$[(Xn-x)^2+(Yn-y)^2+(Zn-z)^2]^{1/2} = c(\text{RSTD}n-Kn)+cKDm+[(xm-x)^2+(ym-y)^2+(zm-z)^2]^{1/2}$$
$$(1 \leq n \leq N) \quad (3)$$

$$=c(\text{RSTD}n-Kn)+B (1 \leq n \leq N) \quad (4)$$

where:

$$B=cKDm+[(xm-x)^2+(ym-y)^2+(zm-z)^2]^{1/2} \quad (5)$$

The term B in equation (5) corresponds to the variable B referred to earlier herein and equals the distance travelled in air by a signal during the signal propagation time KDm, from the synchronization point for antenna element AEm to antenna element AEm, plus the distance of antenna element AEm from the UE. While B is not known (since AEm is not known), it will be the same for all values of n in equation (4) since the UE location remains fixed (or is assumed to remain fixed) and the same antenna element AEm is measured for all RSTDs. Hence B can be treated as one new variable (as asserted previously) and equation (4) can be solved for the coordinates x,y,z of the UE and for B. In this case, 4 RSTD measurements for 4 neighbor eNB antennas would be enough to solve for x,y,z and B. It should be noted that in solving for the coordinates x,y,z and for B when there are extra redundant RSTD measurements (i.e. N>4) and measurement errors (e.g. due to multipath), known methods of minimizing errors may be used such as a least squares method.

Solving equation (4) may be equivalent to locating the UE 100 at the intersection of N spheres (or N circles if the Z coordinate terms in equation (4) are ignored and removed—e.g. due to the Z coordinates all being nearly the same due to a level terrain) centered on the N neighbor antennas An and with radii given by the right hand side of equation (4) for each value of n. This may allow for a solution using iterative methods in which an initial value for B is assumed and values for x,y,z are obtained from equation (4) by finding the intersection point of the spheres (or circles) using this value of B after which B is re-obtained more accurately using equation (4) for one or more values of n and the calculated x,y,z values with the process then repeated.

The method as exemplified so far above can determine the X,Y,Z location coordinates (x,y,z) of the UE 100 without any knowledge of the reference cell for which RSTD measurements were obtained by the UE 100 other than assuming that the same antenna element AEm was measured by the UE 100 for all RSTD measurements. For example, the location coordinates of the antenna element AEm and the internal signal propagation delay KDm to the antenna element AEm are not needed so far. Therefore this part of the method may be used to locate a UE in other situations where a location server has no information for the reference cell (e.g. does not know the locations of the different DAS antenna elements AEm). Moreover the method can also be applied when the eNB N+1 312 supports a small cell or is a Home eNB instead of a DAS where the location of the eNB N+1 312 (or the antenna of the eNB N+1 312) has not been obtained—e.g. such as via a site survey, self-location of the eNB N+1 312 (e.g. using a GPS receiver) or crowdsourcing. In other words, a UE location can be obtained using a reference cell that is an ambiguous cell where the ambiguity is caused by lack of information (e.g. lack of BSA) for the ambiguous cell.

Returning to the example shown in FIG. 3, having obtained the coordinates x,y,z for the UE 100 and the value of B from equation (4), the measured antenna element AEm may be identified by finding the antenna element AEm for which equation (5) is satisfied. Although equation (5) would be exactly satisfied by the measured antenna element AEm when the UE 100 location and value of B were calculated precisely and other terms (e.g. antenna AEm coordinates and internal propagation delay KDm) contain no errors, there will typically be errors that prevent exact equality. Therefore a location server may compute an error term E(m) given by the difference of the two sides of equation (5) as:

$$E(m)=|cKDm+[(xm-x)^2+(ym-y)^2+(zm-z)^2]^{1/2}-B|$$
$$(1 \leq m \leq M) \quad (6)$$

The antenna element AEm for which the unsigned value of E(m) is minimized may then be assumed to be the measured antenna element. If E(m) is significantly less than the error term E(r) for any other antenna element AEr, the determination of AEm may be assumed as reliable. Then, the UE coordinates x,y,z can be recalculated again using equations (1) and (2) as described above for the case where the measured antenna element is known. As one example of solving equations (1) and (2), B can be recalculated using equation (5) with the determined antenna element AEm and the previous UE coordinates x,y,z and then new coordinates x,y,z of the UE can be obtained using Equation (4) with the recalculated value of B. The process can then by iterated by calculating a new value for B using equation (5) and the new x,y,z coordinates. Such a recalculation may typically yield a more accurate UE location if the measured antenna element AEm was correctly identified.

The term B in equation (5) can be related to the bias B* referred to earlier herein by taking another antenna element AEr corresponding to an assumed reference antenna R* described previously and re-expressing equation (5) as:

$$B=cKDr+[(xr-x)^2+(yr-y)^2+(zr-z)^2]^{1/2}+B^* \quad (7)$$

where:

$$B^* = c(KDm - KDr) + [(xm - x)^2 + (ym - y)^2 + (zm - z)^2]^{1/2} - \quad (8)$$
$$[(xr - x)^2 + (yr - y)^2 + (zr - z)^2]^{1/2}$$
$$= c(TDm + KDm) - c(TDr + KDr)$$

Equation (4) could then be solved by substituting the expression for B in equation (7) into equation (4). This will relate the unknown coordinates x,y,z for the UE 100 to the known coordinates Xn,Yn,Zn for each antenna An and the known coordinates xr,yr,zr for the assumed reference antenna element AEr but will introduce a new variable B* equal to, according to equation (8), the product of the signal speed c with the difference between the overall signal propagation delay to the UE 100 from each of the network synchronization points for the measured antenna element AEm and assumed reference antenna element AEr. The new variable B* can be regarded as an error bias caused by measuring a different antenna element AEm to the reference antenna element AEr that is assumed. But mathematically, the computation of the UE coordinates x,y,x and the identification of the measured antenna element AEm does not need to be any different. Moreover, the assumption of a reference antenna element AEr is just an artifice to show more clearly (as described earlier) that an ambiguous cell need only introduce one extra variable into the UE location computation.

A second method of obtaining the UE location for the example shown in FIG. 3 is to change the reference cell associated with eNB N+1 312 to a new reference cell corresponding to one of the neighbor cells for some eNB r 310-*r*. This cannot be done by changing the reference cell that the UE 100 has already measured but instead can be done by calculating the RSTD measurements that the UE 100 would have obtained using the new reference cell in the absence of errors. This can be performed by subtracting RSTDr from both sides of equation (1) to give:

$$RSTDn^* = (RSTDn - RSTDr) \quad (9)$$
$$= (Tn + Kn) - (Tr + Kr) \quad (1 \leq n \leq N, n \neq r)$$

Here RSTDn* is the RSTD measurement that the UE 100 would have made in the absence of errors between antenna Ar (the new reference cell antenna) and each neighbor cell antenna An ($1 \leq n \leq N$, $n \neq r$). In order to solve for the X,Y,Z Cartesian coordinates of the UE, the following equations can be used:

$$[(Xn-x)^2 + (Yn-y)^2 + (Zn-z)^2]^{1/2} - \quad (10)$$
$$[(Xr-x)^2 + (Yr-y)^2 + (Zr-z)^2]^{1/2} =$$
$$c(Tn - Tr) = c(RSTDn^* + Kr - Kn)$$
$$(1 \leq n \leq N, n \neq r)$$

The X,Y,Z location coordinates of the UE 100 can now be obtained from equation (10) provided N≥4. If the UE 100 location is not accurate enough (e.g. has a significant uncertainty due to poor measurements of the neighbor cells for eNBs 1 to N), the measured antenna element AEm for eNB N+1 can be estimated as described earlier based on the inaccurate UE location—e.g. by assuming that AEm is the closest antenna element to the inaccurate UE location. This can enable an initial estimate for the variable B in equation (5) to enable iteration of equations (4) and (5) to find a more accurate location of the UE and value of B as described earlier. The more accurate value of B can then be used to more precisely determine the measured antenna element AEm using equation (6) as described above, after which a final location computation using equations (1) and (2) can be used to determine a more accurate UE location.

In some cases, an ambiguous cell that is measured by a UE 100 may be reported as a neighbor cell by the UE 100 even if the location server requests the UE 100 to treat the ambiguous cell as the reference cell. For example, this may occur if the UE 100 receives a stronger signal from another cell or if the UE 100 is otherwise able to make more accurate RSTD measurements using another reference cell. In addition, more than one neighbor cell for which the UE 100 makes RSRD measurements may be an ambiguous cell (e.g. as may occur in an area where an operator employs a number of cells, each with a DAS, RRHs, repeaters and/or relays). In this case, each RSTD measurement for an ambiguous cell would introduce one additional variable or bias to be solved for as described above. Thus, these RSTD measurements may be initially disregarded by a location server which may solve for the X,Y,Z coordinates of the UE 100 using only the RSTD measurements for the neighbor cells which are not ambiguous (e.g. for cells with just one antenna or for cells with different antennas that also transmit distinct PRS signals). Having obtained the location coordinates of the UE 100, the location server may use the RSTD measurements for one or more of the ambiguous cells to determine the most likely antenna for each such ambiguous cell that that was measured by the UE 100. The location server can then recompute the UE location coordinates using the RSTD measurements for both the unambiguous cells and the ambiguous cells. If there was more than one ambiguous cell, the location server can use the new UE location coordinates to again determine the most likely antenna that was measured for each of the ambiguous cells. If the most likely antennas have not changed, the location computation may be considered as complete. Otherwise, the location server can again determine a new UE location using the new likely antennas for the ambiguous cells. This process can be further iterated. If the antennas for some ambiguous cells are found to stay the same during the iteration but others vary, the RSTD measurements for the ambiguous cells where the antenna sources vary can be disregarded and the UE location can be obtained using the RSTD measurements for the unambiguous cells and the ambiguous cells whose determined antennas are found not to vary. One advantage of treating an ambiguous cell as a neighbor cell rather than as a reference cell is that the antenna source for the measured signals from the ambiguous cell would be much less likely to change over the period of RSTD measurement. This is because the period of RSTD measurement will normally be very short (e.g. less than one second) for a neighbor cell since only one RSTD measurement is normally obtained for a neighbor cell. Conversely, the period of RSTD measurement for a reference cell may be longer (e.g. up to 20 seconds) due to measuring the signal timing difference between the reference cell and every neighbor cell. Therefore, in some situations, a UE (e.g. if aware of an ambiguous cell) or location server may treat ambiguous cells only as neighbor cells.

To describe the solution for multiple ambiguous cells in more detail, assume that in the example in FIG. 3 there are additional eNBs (not shown) similar to eNB N+1 312 and each supporting one cell that have multiple antennas (or multiple antenna elements) that transmit the same PRS within the supported cell. Assuming that RSTD measurements are obtained by the UE 100 for some reference cell belonging to eNB p ($1 \leq p \leq N$), the RSTDs for eNBs 1 to N will be related by equation (11), where RSTD*n denotes the RSTD measurement between the reference cell for eNB p and a neighbor cell for eNB n. The location coordinates x,y,z for the UE may then be obtained using equations (11) and (12) provided N>3 (or N>2 if the Z coordinate terms are ignored and removed—e.g. due to the Z coordinates all being nearly the same due to a level terrain).

$$RSTD^*n = (Tn+Kn) - (Tp+Kp)(1 \leq n \leq N, n \neq p) \quad (11)$$

$$[(Xn-x)^2+(Yn-y)^2+(Zn-z)^2]^{1/2} - [(Xp-x)^2+(Yp-y)^2+(Zp-z)^2]^{1/2} = c(Tn-Tp)(1 \leq n \leq N, n \neq p) \quad (12)$$

The RSTD measured between the ambiguous cell for eNB N+1 312 and the reference cell for eNB p, denoted RSTD*, will satisfy the following equations (13) and (14) if the antenna element measured for eNB N+1 is AEm.

$$RSTD^* = (TDm+KDm) - (Tp+Kp) \quad (13)$$

$$[(xm-x)^2+(ym-y)^2+(zm-z)^2]^{1/2}-[(Xp-x)^2+(Yp-y)^2+(Zp-z)^2]^{1/2}=c(TDm-Tp) \quad (14)$$

giving $$[(xm-x)^2+(ym-y)^2+(zm-z)^2]^{1/2}+cKDm=c\text{RSTD}^*+cKp+[(Xp-x)^2+(Yp-y)^2+(Zp-z)^2]^{1/2} \quad (15)$$

Although equation (15) would be exactly satisfied by the measured antenna element AEm, when the UE location was calculated precisely and the RSTD* term contains no error (e.g. due to multipath), there will typically be errors that prevent exact equality. Therefore a location server may compute an error term E*(m) given by the difference of the two sides of equation (15) as:

$$E^*(m)=|c\text{RSTD}^*+c(Kp-KDm)+[(Xp-x)^2+(Yp-y)^2+(Zp-z)^2]^{1/2}-[(xm-x)^2+(ym-y)^2+(zm-z)^2]^{1/2}|$$
$$(1\le m\le M) \quad (16)$$

The antenna element AEm for which the unsigned value of E*(m) is minimized may then be assumed to be the measured antenna element. If E*(m) is significantly less than the error term E*(n) for any other antenna element AEn, the assumption of AEm may be assumed as reliable. The same type of calculation can also be applied to any of the other ambiguous cells to find the measured antenna or antenna element for each of these cells. The location of the UE 100 may then be recalculated by the location server by combining equations (13) and (14), for each ambiguous cell for which the measured antenna element was identified using equation (16), with equations (11) and (12) to enable a location computation using a larger number of RSTD measurements for more neighbor cells which may enable a more accurate location for the UE 100. The more accurate location for the UE 100 may then be used again in equation (16) to reobtain the measured antenna element AEm for the ambiguous cell for eNB N+1 312 (by finding the antenna element AEm for which E*(m) in equation (16) is minimized) and by doing the same for the other ambiguous cells. The process can be iterated as previously described with the UE 100 location eventually obtained using the RSTD measurements for the unambiguous cells and the RSTD measurements for the ambiguous cells for which a stable (non-varying) measured antenna element is found.

It should be noted that while the techniques as described above may be applied by a location server 302, the techniques can also be used at a UE 100 to calculate its location if a location server 302 and/or other network entity (e.g. a base station) provides the UE 100 with the necessary information to perform the location computation such as the location coordinates of the neighbor eNBs (e.g. in the form of assistance data such as BSA).

In some embodiments, the techniques described above may be further enhanced by making use of network based location information. For example, a serving base station (e.g. eNB) for an ambiguous cell may be able to determine a particular antenna or antenna element that is receiving signals from a UE 100. For example, this may be possible if the signals received by the antenna or antenna element are processed separately to signals received from other antennas or antenna elements (e.g. processed separately by an eNB, an RRH, repeater or relay to which the antenna or antenna element is connected). If a unique antenna or antenna element can be identified by a serving base station while a UE is making OTDOA measurements and can be transferred to a location server (e.g. to an E-SMLC using the 3GPP LPPa protocol), the location server may assume that this antenna or antenna element will also be the one measured by the UE for any RSTD measurements involving the ambiguous cell. For more reliable determination, this antenna or antenna element may be compared with any antenna or antenna element determined as described above (e.g. in association with equation (6) or (16)) from received OTDOA RSTD measurements. If the two determined antennas or antenna elements are found to be the same, the location server can have a higher confidence that this antenna or antenna element was the one measured by the UE for OTDOA RSTD measurements involving the ambiguous cell.

Figure 4:
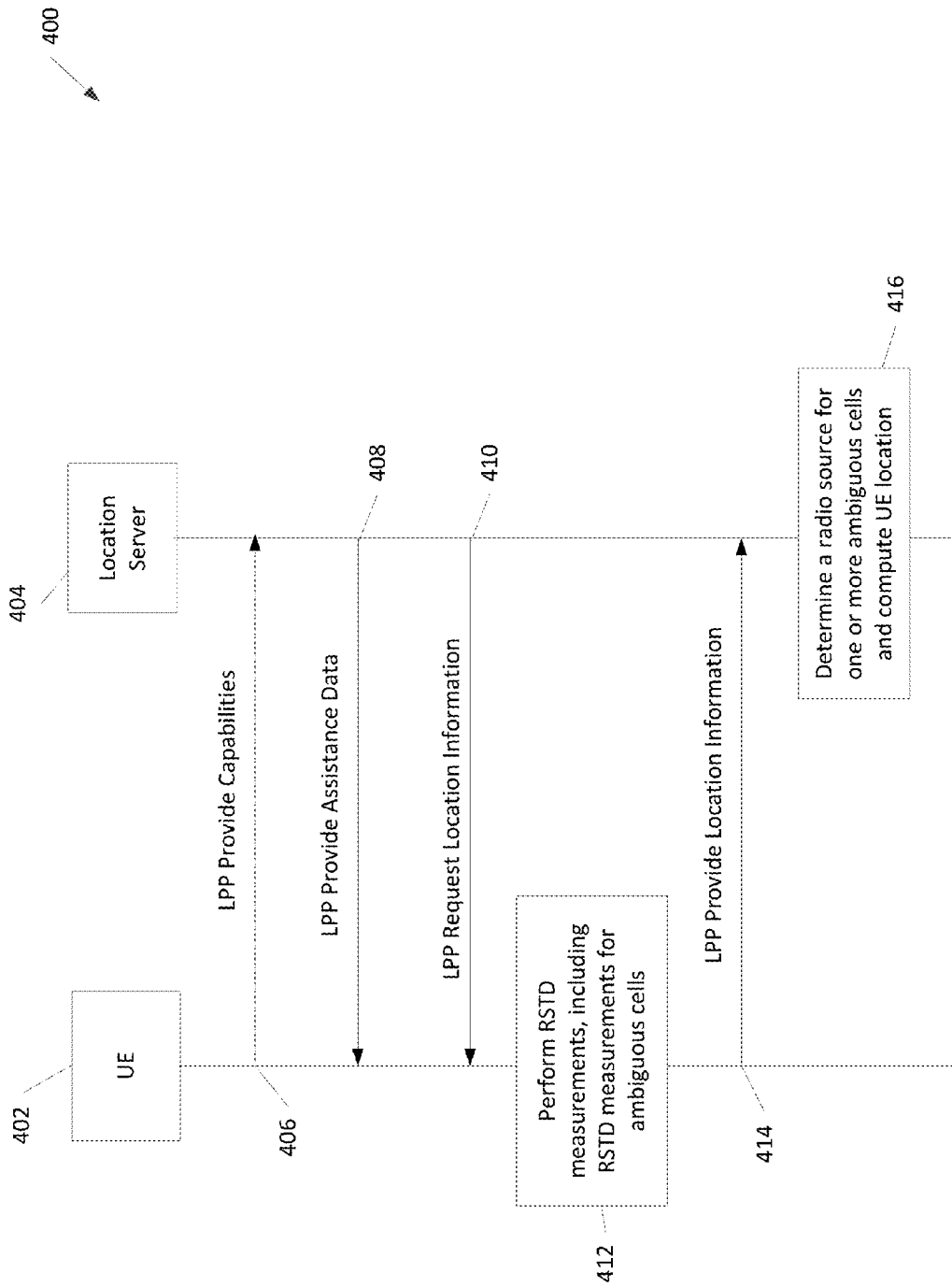
FIG. 4 is a message flow diagram of an example LTE position protocol for supporting positioning using ambiguous cells.

Referring to FIG. 4, with further reference to FIGS. 1-3, a message flow diagram 400 of an example procedure for supporting positioning using ambiguous cells and with the LPP protocol is shown. The entities in the message flow include a UE 402 and a location server 404. The UE 402 may correspond to the UE 100 in FIGS. 1-3 and the location server 404 may correspond to the E-SMLC 208 or SLP 232 in FIG. 2 and/or to the location server 302 in FIG. 3. Positioning of the UE 402 as exemplified in FIG. 4 is supported via an exchange of LPP messages between the UE 402 and the location server 404. The LPP messages and the procedures that they support are described in 3GPP TS 36.355. The procedure shown in FIG. 4 may be used to position the UE in order to support some location related service like navigation or direction finding support for UE 402 (or for the user of UE 402) or for routing or provision of a dispatchable location to a PSAP in association with an emergency call from UE 402 to a PSAP, or for some other reason. Initially and as an optional step, the UE 402 may provide its positioning capabilities to the location server 404 relative to the LPP protocol by sending an LPP Provide Capabilities message 406 to location server 404 indicating the position methods and features of these position methods that are supported by UE 402 using LPP. Location server 404 may then determine to position the UE 402 using OTDOA for LTE access—e.g. because the UE 402 capabilities sent in message 406 indicate support of OTDOA by UE 402 and/or because UE 402 may currently have LTE wireless access to a serving network containing location server 404. Location server 404 may then send an LPP Provide Assistance Data message 408 to UE 402. The LPP Provide Assistance Data message 408 may include OTDOA assistance data to enable UE 402 to make and return OTDOA RSTD measurements and may include information for a reference cell that may include a global ID for the reference cell, a physical cell ID for the reference cell, frequency information, PRS signal information (e.g., bandwidth, number of subframes per PRS positioning occasion, starting point and periodicity of PRS positioning occasions, muting sequence). The LPP Provide Assistance Data message 408 may also include OTDOA assistance data for neighboring cells. In an example, if the UE 402 indicates support for inter-frequency RSTD measurements, the neighbor cell assistance data may be provided for up to 3 frequency layers. The information provided for each neighbor cell in message 408 may be similar to that provided for the reference cell (e.g. may include a cell ID, cell frequency and PRS signal information). The location server 404 may then send an LPP Request Location Information message 410 to UE 402 to request OTDOA RSTD measurements for the reference cell and neighbor cells indicated in the message 408. The LPP Request Location Information message 410 may include environmental characterization data to provide the UE 402 with information about expected multipath and non-line of sight (LOS) signal propagation in the current area. The LPP Request Location Information message 410 may also include a desired accuracy (e.g., of a location estimate based on RSTD measurements provided by the UE) and a response time (e.g., the maximum time between receipt of the LPP Request Location Information message 410 by the UE 402, and the time of the transmission of an LPP Provide Location Information message 414 by the UE 402). An optional periodic reporting period may also be included in the message.

At stage 412, the UE 402 utilizes the OTDOA assistance information received in message 408 and any additional data (e.g. required QoS) received in the message 410 to perform RSTD measurements for the OTDOA position method. The RSTD measurements may be made between the reference cell and each of the neighbor cells indicated in the message 408. Alternatively, the UE 402 may choose a different reference cell (e.g. if strong signals are not received from the reference cell indicated in message 408 or if this reference cell is not the current serving cell for UE 402). The reference cell measured by the UE and/or one or more of the neighbor cells measured by the UE 402 at stage 412 may be ambiguous cells. The UE 402 may or may not be aware of the ambiguous cells but may, nevertheless, be able to make RSTD measurements for these cells using a radio source (e.g. antenna or antenna element) for each ambiguous cell; the identity of the radio source measured for each ambiguous cell may not be known to the UE 402. The UE 402 then sends an LPP Provide Location Information message 414 to the location server 404 after some or all of the requested RSTD measurements have been obtained at stage 412 and before, when or possibly after a maximum response has expired (e.g., a maximum response time provided by the location server 404 in message 410). The LPP Provide Location Information message 414 may include the time at which the RSTD measurements were obtained and the identity of the reference cell for the RSTD measurements (e.g. the reference cell ID and carrier frequency). The message 414 may also include a neighbor cell measurement list including, for each measured neighbor cell, the identity of the cell (e.g. physical cell ID, global cell ID and/or cell carrier frequency), the RSTD measurement for the cell and the quality of the RSTD measurement for the cell. The neighbor cell measurement list may include RSTD data for one or more ambiguous cells (e.g. an ambiguous reference cell and/or one or more ambiguous neighbor cells).

At stage 416, the location server 404 may be configured to employ one or more of the techniques described earlier (e.g. one or more of the techniques associated with equations (1) to (16)) to determine a particular radio source (e.g. a particular antenna, DAS antenna element, RRH, repeater or relay) associated with any (e.g. each) ambiguous cell that was measured by the UE at stage 412. The location server 404 may further use the determined radio source for any (or each) ambiguous cell at stage 416 to obtain the location of UE 402 as described earlier (e.g. in association with equations (1) to (16) and/or by obtaining a variable B or bias B* as described earlier). The location of UE 402 may thereby be obtained more accurately than if the location of UE 402 had been obtained using only the RSTD measurements returned by UE 402 in message 414 for non-ambiguous cells. The more accurate location may be of benefit to location related service for which the positioning of UE 402 was instigated. In determining the radio source for any ambiguous cell and/or in obtaining the location of UE 402 using each such determined radio source at stage 416, the location server may make use of known information for the reference cell, each neighbor cell and each ambiguous cell measured by the UE 402 such as the location of the antenna for each cell, the location of each antenna element for an ambiguous cell employing a DAS, the location of each RRH antenna for an ambiguous cell employing RRHs, information on network synchronization and network synchronization points (e.g. the internal signal propagation delays Kn and KDm referred to earlier in association with FIG. 3) and other information. Such information may include or be part of a BSA and may be stored in an almanac database such as almanac 304 in FIG. 3.

In an embodiment, stage 416 for the determination of a radio source for each of one or more ambiguous cells and the computation of a location for UE 402 may be performed not by location server 404 but by UE 402 after obtaining RSTD measurements at stage 412. This embodiment may be supported if information for the measured reference cell and neighbor cells, enabling computation of a location estimate for UE 402 by UE 402, is included by location server 404 in the LPP Provide Assistance Data message 408. The information may include the location coordinates for each non-ambiguous cell (e.g. the location coordinates Xn,Yn,Zn of each antenna An in the example of FIG. 3), the location coordinates for each separate radio source used in an ambiguous cell (e.g. the location coordinates xm,ym,zm of each antenna element AEm in the example of FIG. 3) and any internal signal propagation delays or delay differences (e.g. such as the internal propagation delays Kn and KDm for the example in FIG. 3). The information may be obtained from an almanac such as almanac 304 in FIG. 3 and (as described later) FIG. 5. Having obtained a location for the UE 402 at stage 416 (performed in this embodiment by UE 402 following stage 412), UE 402 may send the computed UE location to location server 404 in the LPP Provide Location Information message 414. The location server 404 may then use the UE 402 location to support or provide various location related services as before.

It should be noted that while FIG. 4 shows exemplary support for OTDOA positioning using the LPP protocol, other examples exist where the protocol and/or the position method may be different. For example, in alternative embodiments, the position protocol may be LPPe, LPP/LPPe, the RRC protocol defined in 3GPP TS 36.331 or the IS-801 protocol defined in 3GPP2 TS C.S0022. Similarly, the position method may be OTDOA for UMTS access, Enhanced Observed Time Difference (E-OTD) for GSM or AFLT.

Figure 5:
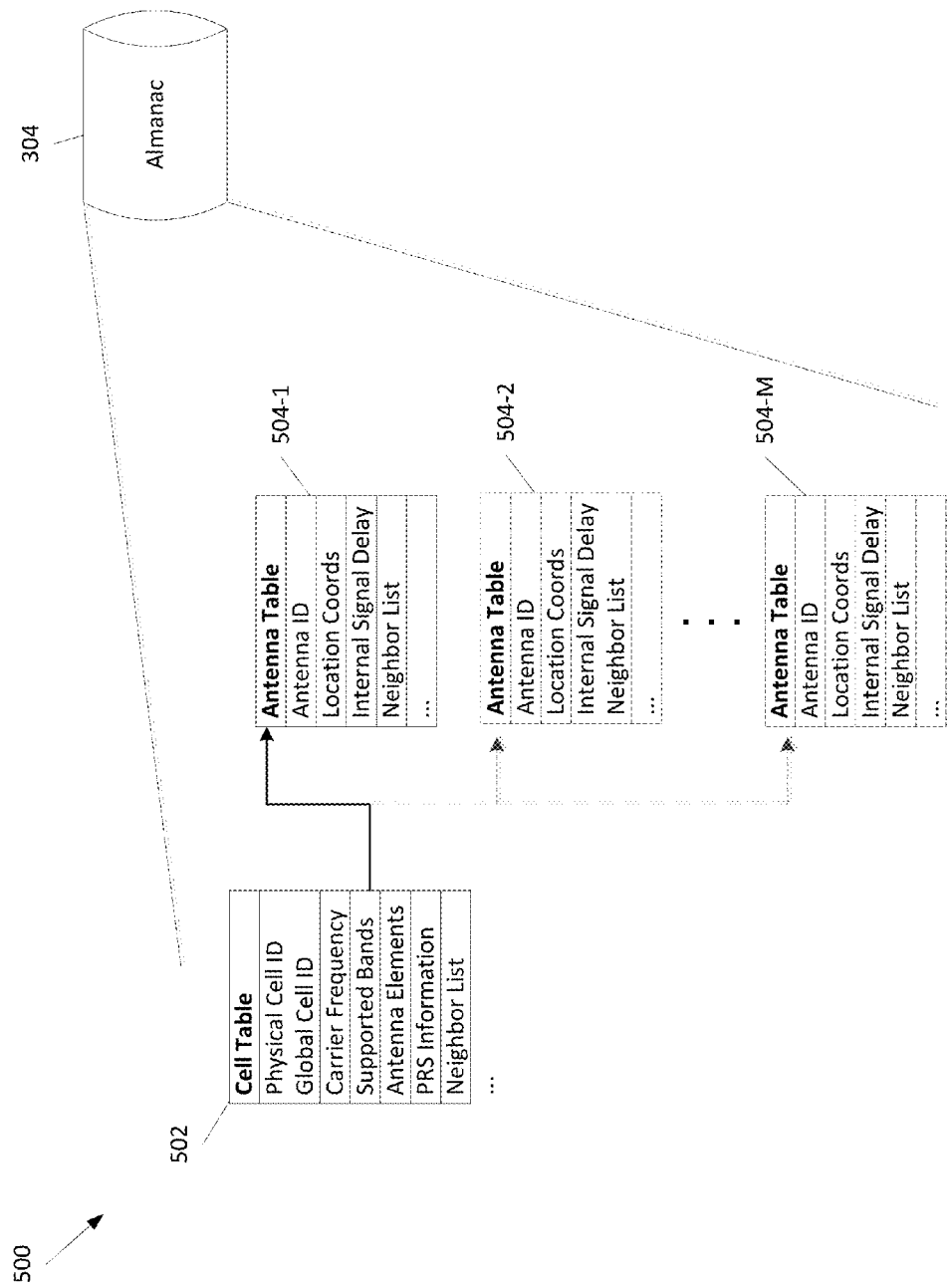
FIG. 5 is an example data structure on a communication network server for supporting positioning.

Referring to FIG. 5, with further reference to FIGS. 1-4, an example data structure 500 on a communication network server is shown. The data structure is exemplary only, and not a limitation, as additional tables, indexes, fields, and relationships may be used. In an example, the data structure 500 includes the almanac 304 of FIG. 3 comprising a collection of data tables such as cell table 502 and antenna tables 504-1, 504-2 to 504-M. The almanac 304 may be a relational database (e.g., Oracle®, Microsoft SQL server, R:Base, etc.) or may be a collection of flat files (e.g., XML). The cell table 502 may include information associated with downlink radio transmission in a particular cell—e.g. a cell supporting LTE access. The information in cell table 502 may be common to all antennas used by the associated cell in the case of any cell that uses multiple antennas (e.g. such as an ambiguous cell). The information in cell table 502 may be intended primarily to support positioning of UEs (e.g. using OTDOA positioning) and may include identification information for the cell such as a physical cell ID and/or a global cell ID, the carrier frequency of the cell, the frequency bands supported by the cell, PRS signal information for the cell to support OTDOA positioning (e.g. number of LTE subframes per PRS positioning occasion, periodicity of PRS positioning occasions, muting pattern) and a list of the identities of other nearby neighbor cells. The cell table 502 may also contain a pointer or pointers or some other information associating cell table 502 to one or more antenna tables 504-1, 504-2, . . . 504-M. The antenna tables 504-1, 504-2, . . . 504-M may be associated with one another (e.g. via pointers) or associated only with the cell table 502. Each antenna table 504-m may provide information for one antenna that may be used to transmit downlink signals in the cell associated with table 502 and possibly to receive uplink signals from UEs receiving coverage from the cell associated with cell table 502. If the cell associated with table 502 only has one antenna, there may only be one antenna table 504-1 and antenna tables 504-2 to 504-M (shown with dashed lines) are not present. If the cell associated with table 502 is an ambiguous cell (e.g. has a number of RRHs or is a DAS), there may be more than antenna table (e.g. 504-1, 504-2, . . . 504-M as shown in FIG. 5) with each antenna table providing information for a distinct antenna or distinct antenna element in the cell. The information in each antenna table 504-m may include information that is unique to the associated antenna such as the antenna location coordinates, an antenna ID, an internal signal propagation delay (e.g. a delay similar to or the same as the internal signal delay Kn or KDm described in association with FIG. 3 earlier) and a list of the IDs of nearby neighbor cells.

The almanac 304 may be used to support the various positioning techniques described in association with FIG. 3 and equations (1) to (16). For example, in the case of the eNBs 1 310-1 to N 310-N shown in FIG. 3, the information for the cell (or one particular cell) supported by any eNB n ($1 \le n \le N$) may be contained in a table such as cell table 502 and the information for the single antenna An associated with this cell may be contained in the antenna table 504-1 (e.g. the internal signal delay in table 504-1 can then provide the value of Kn for antenna An). In the case of the ambiguous cell supported by eNB N+1 312 in FIG. 3, the common information for the ambiguous cell (e.g. information common to all the antenna elements for the ambiguous cell) may be contained in a table such as cell table 502 and the information for each antenna element AEm ($1 \le m \le M$) for the ambiguous cell may be contained in a table such as antenna table 504-m (e.g. the internal signal delay in antenna table 504-m can then provide the value of KDm for antenna element AEm). In this case, there will be M antenna tables 504-1, 504-2, . . . 504-M, each corresponding to and providing information for different ones of the M antenna elements AE1, AE2, . . . , AEm.

The data structure 500 may be included in the location server 302 of FIG. 3, the location server 404 of FIG. 4 and/or may be (or may be contained in) another remote server within the wireless communication system 300. The data structure 500 may include other or additional tables and fields based on the radio access technology and positioning methods. In an example, the almanac 304 may include RF-fingerprinting information such as RF heat map data. The heat map data may be indexed by location, for example, and may provide expected signal strength information for one or more nodes/antennas based on the location information. In an embodiment, some or all of the information in data structure 500 may be provided to a UE 402 in the LPP Provide Assistance Data message 408 described above for FIG. 4. For example, in the case of an ambiguous cell, a location server 404 may provide the information in tables 502 and 504-1 to 504-M to a UE 402 to enable the UE 402 to compute its own location based on information for multiple radio sources (e.g. multiple DAS antenna elements) in the ambiguous cell.

Figure 6:
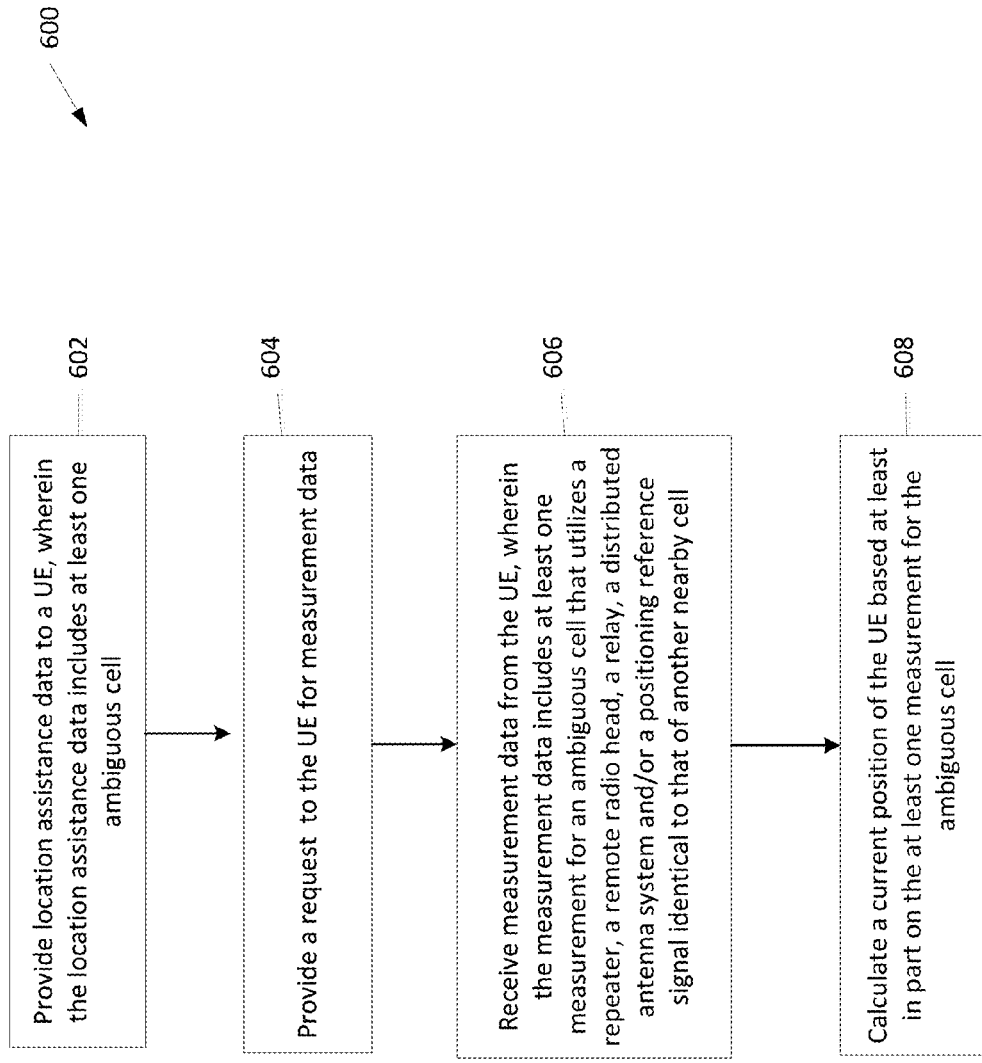
FIG. 6 is a block flow diagram of a process for calculating a current position of a UE based on an ambiguous cell.

Referring to FIG. 6, with further reference to FIGS. 1-5, a process 600 for calculating a current position of a UE 100 based on an ambiguous cell includes the stages shown. The process 600 is, however, an example only and not limiting. The process 600 can be altered, e.g., by having stages added, removed, rearranged, combined, and/or performed concurrently.

At stage 602 a location server, which may be the E-SMLC 208, SLP 232, location server 302 or location server 404, is configured to provide location assistance data to a UE, which may be the UE 100, wherein the location assistance data includes at least one ambiguous cell. In an example, the location server may not provide the location assistance data to the UE (e.g, if not requested by the UE). The E-SMLC 208, SLP 232, and/or almanac 304 may be a means for providing location assistance data to the UE. Stage 602 may correspond to the LPP Provide Assistance Data message 408 in FIG. 4. The location assistance data transferred at stage 602 may include a reference cell and neighboring cell information to enable the UE to perform RSTD measurements. The location assistance data may contain data stored in a data structure 500 within an almanac 304, and may include data (e.g. data from an almanac 304) for an ambiguous cell. The term ambiguous cell as used herein generally refers to either (i) a cell containing multiple sources of the same downlink radio signal (e.g. same PRS signal) that may be measured by a UE for positioning of the UE or (ii) a cell that transmits the same positioning related radio signal (e.g. same PRS signal) as another nearby cell. In an example, an ambiguous cell may be a radio access technology configured to transmit identical radio signals within the same cell by antennas at different locations within the cell (e.g., simulcast). Specific examples of an ambiguous cell include a Distributed Antenna System (DAS), one or more Remote Radio Heads (RRHs), one or more repeaters and/or one or more relays.

At stage 604 the location server is configured to provide a request to the UE for measurement data. In an example, the UE may provide measurement data in some cases to the location server without previously receiving a request (e.g. if the UE rather than the location server is instigating positioning of the UE). Stage 604 may correspond to the LPP Request Location Information message 410 in FIG. 4. The request sent at stage 604 may be configured to instruct the UE to obtain signal measurements based on the location assistance data provided at stage 602. In an example, the request at stage 604 may include additional parameters such as environmental characterization data, a desired accuracy value (e.g., of a location estimate based on RSTD measurements provided by the UE), a response time, and/or a periodic reporting period.

At stage 606 the location server is configured to receive measurement data from the UE, wherein the measurement data includes at least one measurement for an ambiguous cell. The ambiguous cell is the same ambiguous cell as included in the location assistance data sent at stage 602, if stage 602 occurs. The ambiguous cell may utilize a repeater, a remote radio head, a relay, a distributed antenna system and/or a positioning reference signal identical to that of another nearby cell. Stage 606 may correspond to the LPP Provide Location Information message 414 in FIG. 4. The measurement data received at stage 606 may be generated by the UE and may include a time stamp for the measurements and/or a set of RSTD measurements for the OTDOA position method. In the case of providing RSTD measurements at stage 606, the measurement data may include the quality of a TOA measurement for a reference cell and/or the quality of RSTD measurements for a set of neighbor cells (e.g., may include the identity, the RSTD measurement and the quality of the RSTD measurement for each measured neighbor cell). The at least one measurement for the ambiguous cell may be an RSTD measurement, in which case the ambiguous cell may be a reference cell or a neighbor cell for this RSTD measurement.

At stage 608 the location server is configured to calculate a current position of the UE based at least in part on the at least one measurement for the ambiguous cell received at stage 606. The location server may be configured to utilize the techniques described above in association with FIG. 3 and equations (1) to (16) to calculate the current position of the UE. For example, the process steps and equations described above may be stored within a memory unit as computer-executable steps within the location server and one or more processors in the location server may be configured to execute the computer-executable steps to calculate the current position of the UE.

In an embodiment, a particular radio source (e.g. a particular RRH, DAS antenna element, repeater or relay) for the ambiguous cell may be determined by the location server at stage 608 based on the least one measurement for the ambiguous cell received at stage 606 and data in an almanac 304. The almanac 304 may include a cell table 502 and/or antenna tables 504-1 to 504-M for the ambiguous cell as described in association with FIG. 5. The particular radio source that is determined at stage 608 may be the one that was measured by the UE in order to provide the at least one measurement for the ambiguous cell at stage 606. For example, the radio source may be the radio source that was measured by the UE in order to provide an RSTD measurement at stage 606 for which the ambiguous cell is a reference cell or a neighbor cell. The location of the UE may then be obtained or reobtained at stage 608 making use of the determined radio source for the ambiguous cell, the measurement data received at stage 606 and almanac data 304 for the ambiguous cell and any other measured cells. Obtaining or reobtaining the UE location may include use of iteration and/or use of a least squares method when more measurements are provided than minimally needed and/or when some or all of the measurements contain errors.

Figure 7:
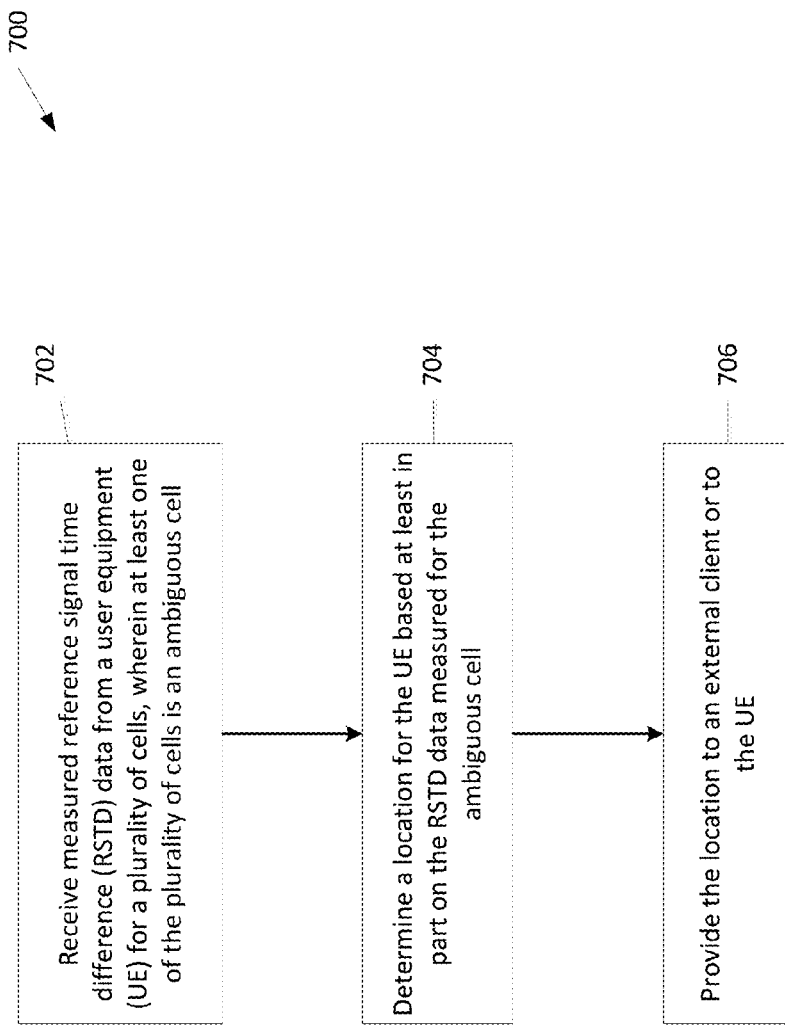
FIG. 7 is a block flow diagram of a process for providing a location to a UE or an external client based on measurements for OTDOA.

Referring to FIG. 7, with further reference to FIGS. 1-6, a process 700 for providing a location to a UE (e.g. the UE 100 or the UE 402) or to an external client (e.g. a PSAP such as i3 PSAP 244 or legacy PSAP 248 in the case of location for an emergency call) based on RSTD measurements includes the stages shown. The process 700 is, however, an example only and not limiting. The process 700 can be altered, e.g., by having stages added, removed, rearranged, combined, and/or performed concurrently. For example, a location for the UE may be stored on a location server or used internally within a network (e.g. a network 250) and not provided to the UE or to an external client. The location server for the process 700 may be the E-SMLC 208, SLP 232, location server 302 or location server 404.

At stage 702, the location server is configured to receive measured reference signal time difference (RSTD) data from a UE 100 for a plurality of cells, wherein at least one of the plurality of cells is an ambiguous cell. The RSTD data may be provided in an LPP Provide Location Information message which may correspond to message 414 in FIG. 4. In an example, referring to FIG. 3, the RSTD data may be measured for non-ambiguous cells (e.g., cells for eNBs 1 310-1 to N 310-N) and one or more ambiguous cells (e.g. the ambiguous cell for eNB N+1 312).

At stage 704, the location server is configured to determine a location for the UE based at least in part on the RSTD data measured for the ambiguous cell that was received at stage 702. The location server 302 may be configured to solve for the X, Y and Z coordinates (or just the X and Y coordinates) of the UE based on equations (1) to (16) provided above in association with FIG. 3. At stage 706, the location server 302 may be configured to provide the determined location to an external client or to the UE. In an example, the location server may store the location, or provide the location information to another server or other network entity (e.g. an LRF 230) for other location based services (e.g. such as determining routing of an emergency call by an LRF 230).

Figure 8A:
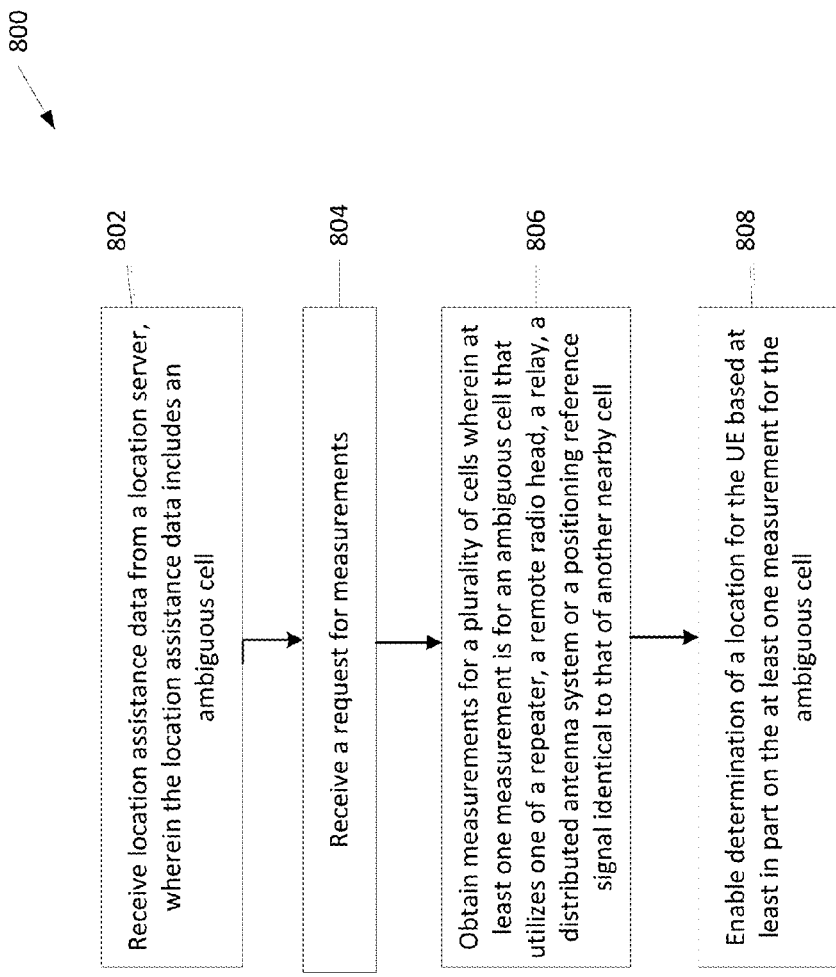
FIG. 8A is a block flow diagram of a process for utilizing a UE to determine a current location based on one or more ambiguous cells.

Referring to FIG. 8A, with further reference to FIGS. 1-5, a process 800 for utilizing a UE to determine a current location for the UE based on one or more ambiguous cells includes the stages shown. The process 800 is, however, an example only and not limiting. The process 800 can be altered, e.g., by having stages added, removed, rearranged, combined, and/or performed concurrently. The UE for the process 800 may be the UE 100 or the UE 402. The location server for the process 800 may be the E-SMLC 208, SLP 232, location server 302 or location server 404.

At stage 802 the UE 100 is configured to receive location assistance data from a location server, wherein the location assistance data includes at least one ambiguous cell. The location assistance data may be received in an LPP Provide Assistance Data message which may correspond to message 408 in FIG. 4. In an example, the ambiguous cell may be identified as a reference cell for the OTDOA position method or as a neighbor cell. The ambiguous cell may correspond to the ambiguous cell for eNB N+1 312 in FIG. 3. At stage 804, the UE 100 is configured to receive a request for measurements. In an example, the request may be received in an LPP Request Location Information message such as message 410 in FIG. 4. The request at stage 804 is configured to instruct the UE 100 to determine signal measurements—e.g. RSTD measurements for OTDOA. The request at stage 804 may include additional parameters such as environmental characterization data, a desired accuracy value (e.g. of a location estimate based on RSTD measurements provided by the UE), a response time, and/or a periodic reporting period. The wireless transceiver 121 in the UE 100 may be a means for receiving the request for measurements at stage 604. In an embodiment, the location assistance data received at stage 802 and the request for measurements received at stage 804 may be received within the same message. This message may be defined for SUPL, LPP, LPP/LPPe or for some other protocol or protocols (e.g. a transport protocol).

At stage 806 the UE 100 is configured to obtain measurements for a plurality of cells wherein at least one measurement is for an ambiguous cell (e.g. the ambiguous cell included at stage 802). The ambiguous cell may utilize one of (or at least one) a repeater, a remote radio head, a relay, a distributed antenna system or a position reference signal identical to that of another nearby cell. The wireless transceiver 121 and the processor 111 may be a means for obtaining the measurements. The measurements may include RSTD measurements for the OTDOA position method for a reference cell and one or more neighboring cells. The UE 100 may use the assistance data received at stage 802, if stage 802 occurs, and/or the request for measurements received at stage 804, if stage 804 occurs, to (i) determine which measurements to obtain at stage 806 (e.g. whether to obtain RSTD measurements and, if so, which reference cell and neighbor cells to measure) and, in some cases, (ii) assist in obtaining the measurements (e.g. to know in advance the characteristics of PRS signals for which RSTD measurements are needed).

At stage 808, a location of the UE is determined or enabled based at least in part on the at least one measurement for the ambiguous cell. Stage 808 represents different methods to enable the determination of a location for the UE, such as local and/or remote processing. In an example where the UE obtains RSTD measurements at stage 806 for which the ambiguous cell is the reference cell, the memory 140 includes instructions to determine the X,Y,Z location coordinates (or just the X,Y location coordinates) of the UE without any knowledge of the ambiguous cell (e.g., other than assuming that the same antenna or the same antenna element for the ambiguous cell was measured by the UE for all RSTD measurements at stage 806). In other embodiments, where RSTD measurements are obtained at stage 806, the ambiguous cell may be a reference cell or a neighbor cell for one or more RSTD measurements and the UE may use the techniques described earlier in association with FIG. 3 and equations (1) to (16) to (i) calculate an initial location of the UE, (ii) determine which radio source (e.g. which antenna element for an ambiguous cell with a DAS) was measured by the UE at stage 806 and (iii) obtain another more accurate location for the UE based on the determined radio source for the ambiguous cell. The memory 140 for the UE may include computer-executable instructions based on the procedure and equations described herein.

Figure 8B:
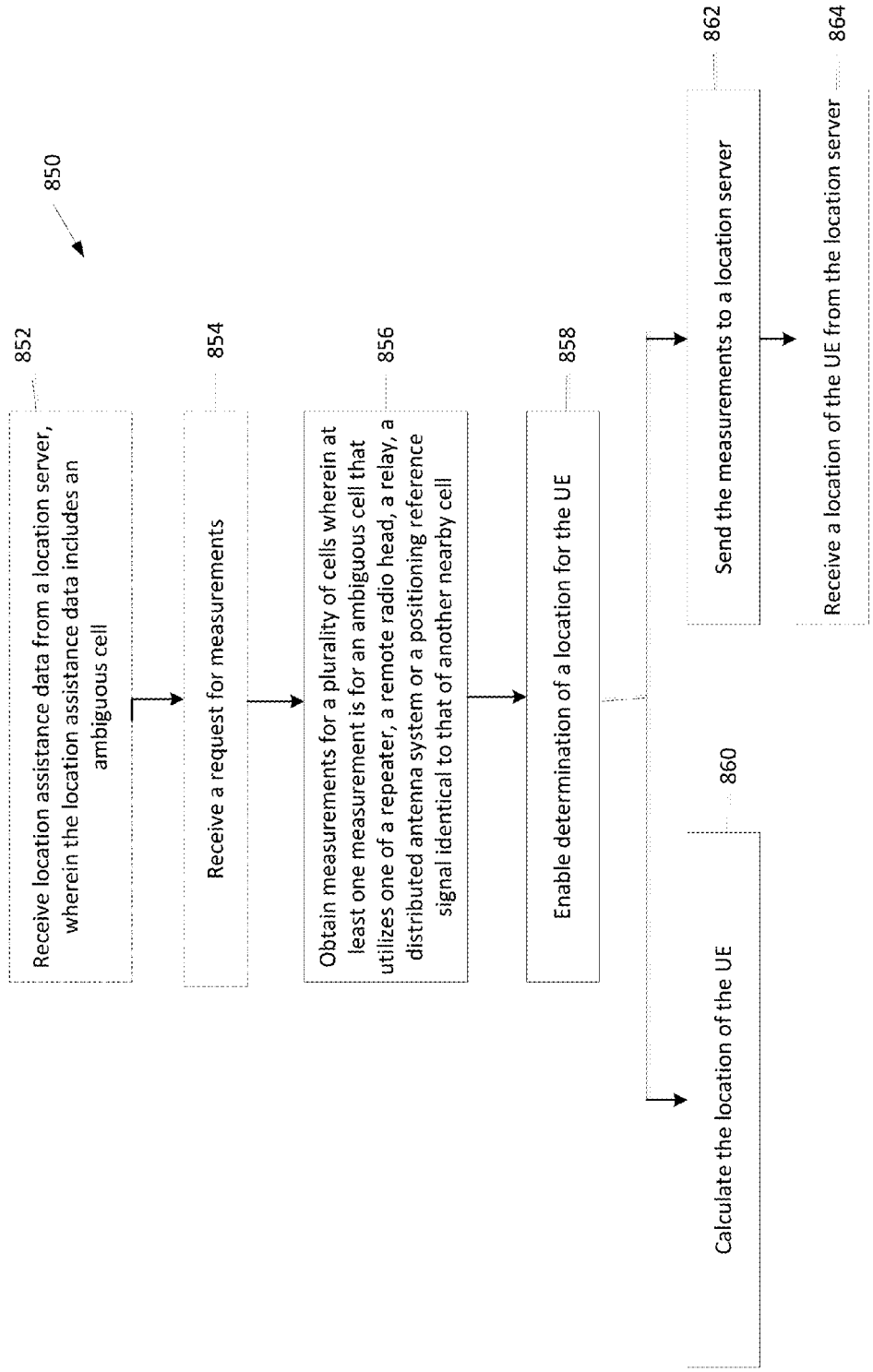
FIG. 8B is a block flow diagram of another process for utilizing a UE to determine a current location based on one or more ambiguous cells.

Referring to FIG. 8B, with further reference to FIGS. 1-5, another process 850 for utilizing a UE to determine a current location for the UE based on one or more ambiguous cells includes the stages shown. The process 850 is, however, an example only and not limiting. The process 850 can be altered, e.g., by having stages added, removed, rearranged, combined, and/or performed concurrently. For example, stage 852 and stage 854 are optional as the UE 100 may not receive assistance data and a measurement request. The UE 100 may be configured to provide measurements (e.g. RSTD measurements) to a location server at stage 862 and receive a current location from the location server at stage 864 (e.g., remote processing). In an alternative embodiment, the UE may calculate a current location locally at stage 860. The UE for the process 850 may be the UE 100 or the UE 402. The location server for the process 850 may be the E-SMLC 208, SLP 232, location server 302 or location server 404.

At stage 852 the UE 100 is optionally configured to receive location assistance data from a location server, wherein the location assistance data includes at least one ambiguous cell. The location assistance data may be received in an LPP Provide Assistance Data message which may correspond to message 408 in FIG. 4. In an example, the ambiguous cell may be identified as a reference cell for the OTDOA position method or as a neighbor cell. The ambiguous cell may correspond to the ambiguous cell for eNB N+1 312 in FIG. 3. At stage 854, the UE 100 is optionally configured to receive a request for measurements. In an example, the request may be received in an LPP Request Location Information message such as message 410 in FIG. 4. The request at stage 854 is configured to instruct the UE 100 to determine signal measurements—e.g. RSTD measurements for OTDOA. The request at stage 854 may include additional parameters such as environmental characterization data, a desired accuracy value (e.g. of a location estimate based on RSTD measurements provided by the UE), a response time, and/or a periodic reporting period. The wireless transceiver 121 in the UE 100 may be a means for receiving the request for measurements at stage 604. In an embodiment, the location assistance data received at stage 852 and the request for measurements received at stage 854 may be received within the same message. This message may be defined for SUPL, LPP, LPP/LPPe or for some other protocol or protocols (e.g. a transport protocol).

At stage 856 the UE 100 is configured to obtain measurements for a plurality of cells wherein at least one measurement is for an ambiguous cell (e.g. the ambiguous cell included at stage 852). The ambiguous cell may utilize one of (or at least one) a repeater, a remote radio head, a relay, a distributed antenna system or a position reference signal identical to that of another nearby cell. The wireless transceiver 121 and the processor 111 may be a means for obtaining the measurements. The measurements may include RSTD measurements for the OTDOA position method for a reference cell and one or more neighboring cells. The UE 100 may use the assistance data received at stage 852, if stage 852 occurs, and/or the request for measurements received at stage 854, if stage 854 occurs, to (i) determine which measurements to obtain at stage 856 (e.g. whether to obtain RSTD measurements and, if so, which reference cell and neighbor cells to measure) and, in some cases, (ii) assist in obtaining the measurements (e.g. to know in advance the characteristics of PRS signals for which RSTD measurements are needed).

At stage 858, a location of the UE is determined or enabled based at least in part on the at least one measurement for the ambiguous cell. Stage 858 represents different methods to enable the determination of a location for the UE, such as local and/or remote processing. In an embodiment, at stage 862, the UE is configured to send the measurements obtained at stage 856 (including the at least one measurement for the ambiguous cell) to the location server (e.g., for remote processing). The measurements may be sent in an LPP Provide Location Information message such as message 414 in FIG. 4. In an embodiment, the measurements may include RSTD measurements including at least one RSTD measurement for the ambiguous cell which the location server may use to determine a location for the UE using the techniques described earlier in association with FIG. 3 and equations (1) to (16). At stage 854 which is optional, the UE may receive the determined location for the UE from the location server. Alternatively, at stage 860, the UE is configured to calculate the location of the UE (e.g., local processing). The processor 111 may be a means for calculating the location of the UE. In an example where the UE obtains RSTD measurements at stage 856 for which the ambiguous cell is the reference cell, the memory 140 includes instructions to determine the X,Y,Z location coordinates (or just the X,Y location coordinates) of the UE without any knowledge of the ambiguous cell (e.g., other than assuming that the same antenna or the same antenna element for the ambiguous cell was measured by the UE for all RSTD measurements at stage 856). In other embodiments, where RSTD measurements are obtained at stage 856, the ambiguous cell may be a reference cell or a neighbor cell for one or more RSTD measurements and the UE may use the techniques described earlier in association with FIG. 3 and equations (1) to (16) to (i) calculate an initial location of the UE, (ii) determine which radio source (e.g. which antenna element for an ambiguous cell with a DAS) was measured by the UE at stage 856 and (iii) obtain another more accurate location for the UE based on the determined radio source for the ambiguous cell. The memory 140 for the UE may include computer-executable instructions based on the procedure and equations described herein.

The techniques described previously in association with FIGS. 1-8B and the example described later herein for FIG. 10 make use of examples in which there are one or more ambiguous cells. However, the same techniques may be used in cases of partially ambiguous cells. For example, a cell may make use of multiple radio sources (e.g. DAS antenna elements, RRHs, repeaters and/or relays) and may be configured by an operator such that some of the radio sources transmit different positioning related signals (e.g. PRS signals for OTDOA) to other radio sources. A target UE may then be able to distinguish some radio sources from others by distinguishing between the different positioning related signals. For example in the case of OTDOA positioning for LTE access, a partially ambiguous cell may have a set of radio sources (e.g. DAS antenna elements or RRHs) that can be partitioned into two sets A and B. The PRS signal transmitted by each radio source in the set A may be the same but may differ from the PRS signal transmitted by each radio source in the set B due to using a different PRS code sequence, a different PRS frequency or a different set of frequencies, different PRS timing (e.g. different and non-overlapping PRS positioning occasions) and/or a different PRS muting sequence. A UE may then specifically measure the time of arrival of PRS signals from some radio source within the set A and not within the set B by performing coherent or non-coherent integration of a received PRS signal based on the PRS code, frequency, timing and muting characteristics of the radio sources in the set A. The UE may then determine an RSTD measurement from the time of arrival measurement and may use the RSTD measurement to help determine the UE location or may return the RSTD measurement to a location server to help determine the UE location—e.g. as described in association with FIG. 4. Although the UE or location server can know that the RSTD measurement is for some radio source in the set A and not in the set B, the UE or location server may not normally be able to determine which radio source in the set A the RSTD measurement applies to. The UE or location server may then use the techniques previously described (e.g. in association with FIG. 3 and equations (1) to (16)) to determine the radio source in the set A and thereby obtain a more accurate UE location.

Figure 9:
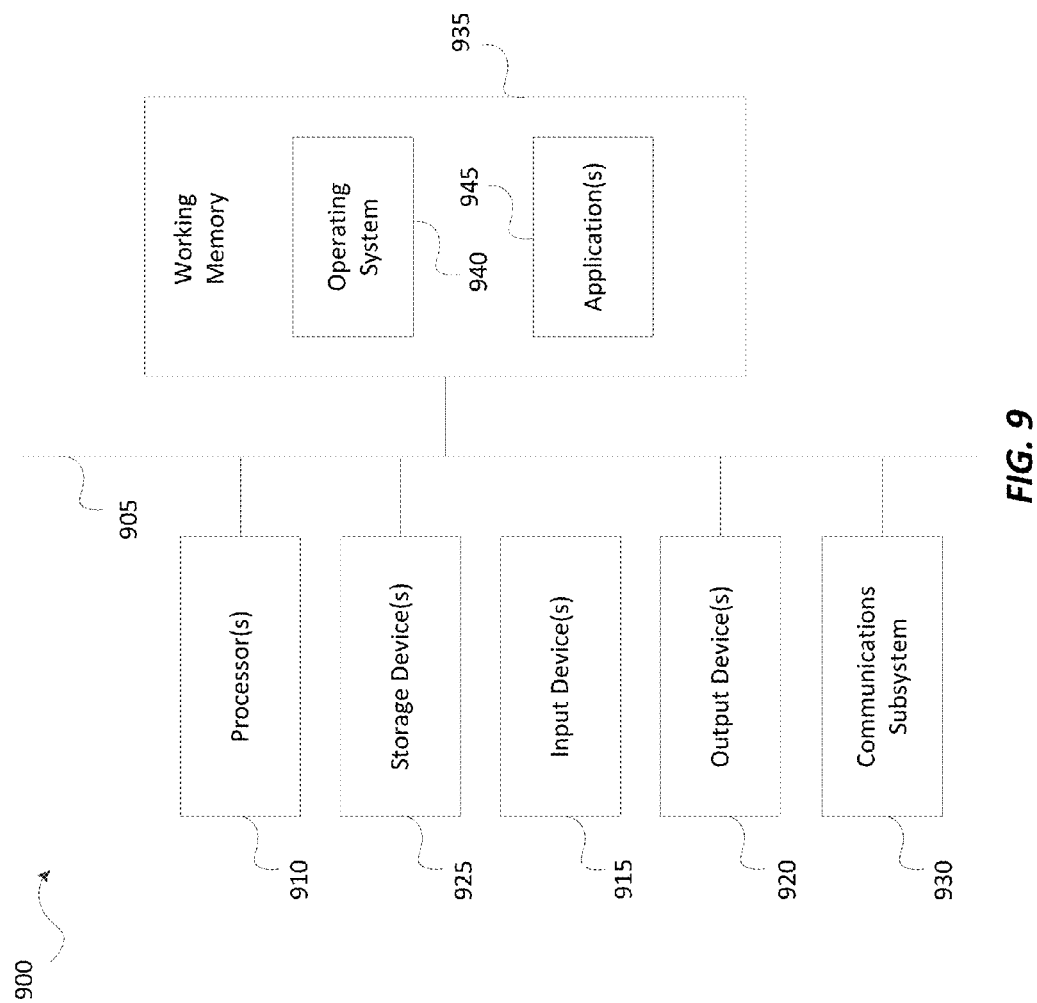
FIG. 9 is a block diagram of components of one embodiment of a computer system for use in positioning using ambiguous cells.

Referring to FIG. 9, with further reference to FIGS. 1-8, a computer system 900 may be utilized in positioning based on an ambiguous cell to at least partially implement the functionality of some of the elements in FIGS. 2, 3, 4, 5, 6, 7 and 10. FIG. 9 provides a schematic illustration of one embodiment of a computer system 900 that can perform the methods provided by various other embodiments, as described herein, and/or can function as a mobile device or other computer system. For example, the E-SMLC 208, SLP 232, location server 302, location server 404 and the almanac 304 may be comprised of one or more computer systems 900. FIG. 9 provides a generalized illustration of various components, any or all of which may be utilized as appropriate. FIG. 9 therefore, broadly illustrates how individual system elements may be implemented in a relatively separated or relatively more integrated manner.

The computer system 900 is shown comprising hardware elements that can be electrically coupled via a bus 905 (or may otherwise be in communication, as appropriate). The hardware elements may include one or more processors 910, including without limitation one or more general-purpose processors and/or one or more special-purpose processors (such as digital signal processing chips, graphics accelera-tion processors, and/or the like); one or more input devices 915, which can include without limitation a mouse, a keyboard and/or the like; and one or more output devices 920, which can include without limitation a display device, a printer and/or the like. The processor(s) 910 can include, for example, intelligent hardware devices, e.g., a central processing unit (CPU) such as those made by Intel® Corporation or AMD®, a microcontroller, an ASIC, etc. Other processor types could also be utilized.

The computer system 900 may further include (and/or be in communication with) one or more non-transitory storage devices 925, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 900 may also include a communications subsystem 930, which can include without limitation a modem, a network card (wireless or wired), an infrared communication device, a wireless communication device and/or chipset (such as a Bluetooth short-range wireless communication technology transceiver/device, an 802.11 device, a WiFi device, a WiMax device, cellular communication facilities, etc.), and/or the like. The communications subsystem 930 may permit data to be exchanged with a network (such as the network described below, to name one example), other computer systems, and/or any other devices described herein. In many embodiments, the computer system 900 will further comprise, as here, a working memory 935, which can include a RAM or ROM device, as described above.

The computer system 900 can also comprise software elements, shown as being currently located within the working memory 935, including an operating system 940, device drivers, executable libraries, and/or other code, such as one or more application programs 945, which may comprise computer programs provided by various embodiments, and/or may be designed to implement methods, and/or configure systems, provided by other embodiments, as described herein. Merely by way of example, one or more processes described herein might be implemented as code and/or instructions executable by a computer (and/or a processor within a computer). Such code and/or instructions can be used to configure and/or adapt a general purpose computer (or other device) to perform one or more operations in accordance with the described methods.

A set of these instructions and/or code might be stored on a computer-readable storage medium, such as the storage device(s) 925 described above. In some cases, the storage medium might be incorporated within a computer system, such as the computer system 900. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 900 and/or might take the form of source and/or installable code, which, upon compilation and/or installation on the computer system 900 (e.g., using any of a variety of generally available compilers, installation programs, compression/decompression utilities, etc.) then takes the form of executable code.

Substantial variations may be made in accordance with specific desires. For example, customized hardware might also be used, and/or particular elements might be implemented in hardware, software (including portable software, such as applets, etc.), or both. Further, connection to other computing devices such as network input/output devices may be employed.

The computer system 900 may be used to perform methods in accordance with the disclosure. Some or all of the procedures of such methods may be performed by the computer system 900 in response to processor(s) 910 executing one or more sequences of one or more instructions (which might be incorporated into the operating system 940 and/or other code, such as an application programs 945) contained in the working memory 935. Such instructions may be read into the working memory 935 from another computer-readable medium, such as one or more of the storage device(s) 925. Merely by way of example, execution of the sequences of instructions contained in the working memory 935 might cause the processor(s) 910 to perform one or more procedures of the methods described herein.

The techniques previously described (e.g. in association with FIGS. 2-8 and equations (1) to (16)) may be further extended to support other position methods for which one or more measurements may be obtained by a UE (e.g. the UE 100) for an ambiguous cell or a plurality of ambiguous cells. For example, in the case of the ECID position method, a UE may obtain one or measurements for an ambiguous cell that enable or help to enable the determination of the straight line distance from the UE to the radio source for the cell measured by the UE (e.g. an RRH or a DAS antenna element). The measurement(s) may be of RSSI, S/N, RTT, Timing Advance (TA), receive-transmit (Rx-Tx) time difference or of some other signal characteristic. The measurement(s) may be directly converted into an expected distance between the UE and the measured radio source in some cases. For example, as is well known, the expected distance will equal (c RTT/2) or (c TA/2) in the case of an RTT or TA measurement in the absence of multipath, where c is the signal speed in air (e.g. speed of light). In the case of an RSSI or S/N measurement, knowledge or estimation of certain information such as signal transmission power, antenna gain, signal attenuation with distance for the type of environment traversed by the signal (e.g. rural, suburban, urban), and/or signal interference dependence on distance may be similarly used to estimate an expected distance between the UE and the measured radio source. In the case of a measurement of the difference between the downlink and uplink signal timing at the UE which may be provided by an Rx-Tx measurement, a combination of this measurement with a similar measurement obtained at the radio source that is in communication with the UE may provide the signal RTT (as is well known) and the RTT may then be converted to an expected distance between the UE and the measured radio source. In some cases, an expected or estimated error (or errors) in a UE measurement or measurements (e.g. of RTT, S/N, RSSI etc.) may be used to determine a corresponding error or uncertainty in the expected distance between the UE and the measured radio source calculated from the measurement(s). For example, there may be a known or estimated imprecision in certain measurements (e.g. for RTT, S/N, Rx-Tx) caused by measurement error and/or signal multipath and/or a similar imprecision in certain means for converting the measurement or measurements into an expected distance. The uncertainty in the expected distance may be expressed in some cases using a maximum distance and a minimum distance with the expected distance normally in between these. Although the measured radio source is not typically known for an ambiguous cell, a location server (or the UE) may use the expected distance (and any uncertainty in the expected distance) between the UE and the measured radio source plus an approximate location for the UE obtained using other means (e.g. UE measurements of unambiguous cells) to determine the probable radio source that was measured.

Figure 10:
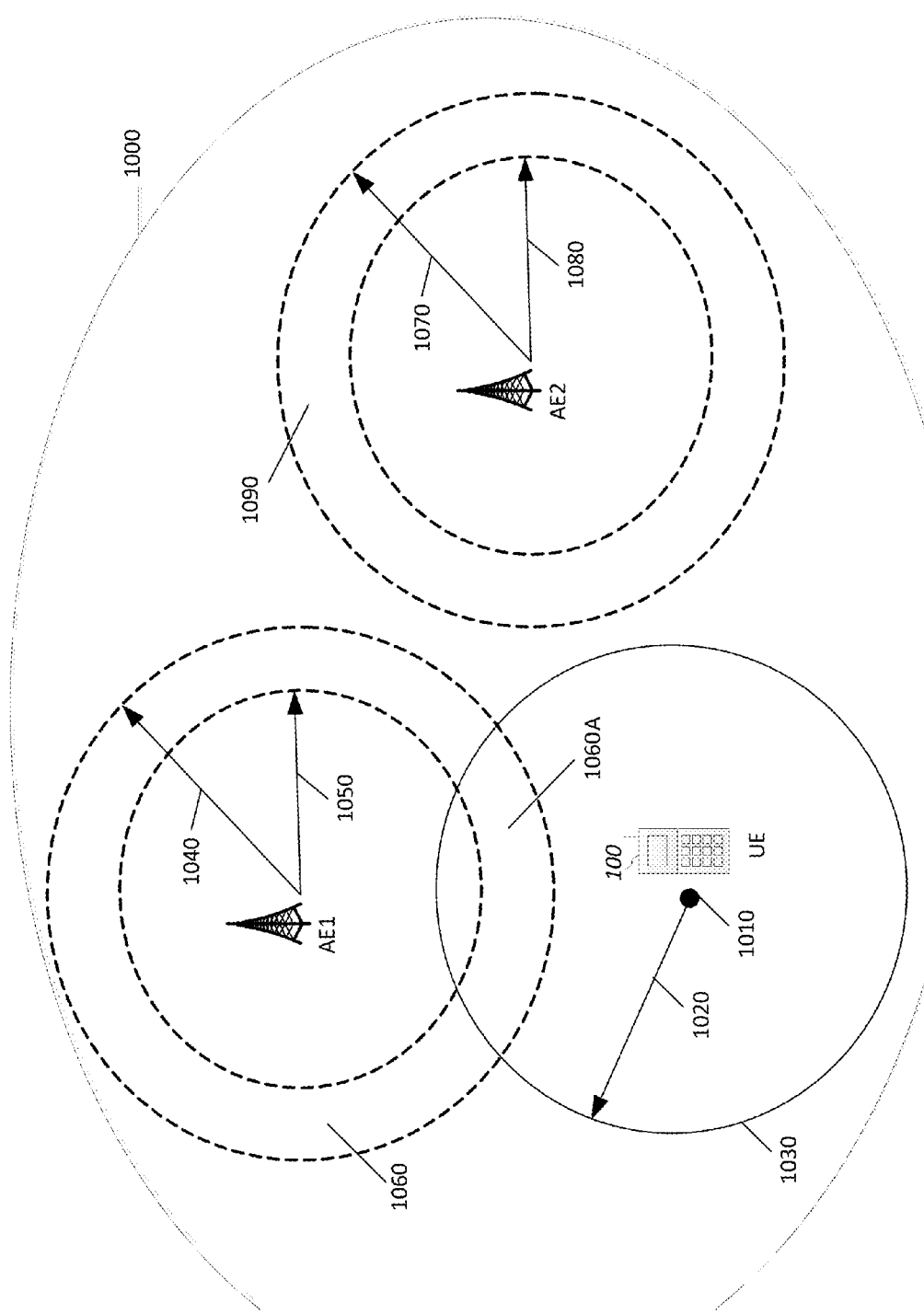
FIG. 10 is a high level architecture showing use of an ambiguous cell to locate a UE.

FIG. 10 provides an exemplary illustration of how a distance related measurement (e.g. obtained as just described) between a UE 100 and a radio source in an ambiguous cell may be used to determine the radio source and improve the accuracy of a location estimate for the UE 100. FIG. 10 shows an ambiguous cell 1000 that contains two antenna elements (or antennas) AE1 and AE2, each providing partial coverage within the ambiguous cell 1000. For example, ambiguous cell 1000 may correspond to the ambiguous cell for eNB N+1 312 in FIG. 3 and antenna elements AE1 and AE2 may be antenna elements AE1 and AE2 in FIG. 3. FIG. 10 exemplifies just X and Y coordinates though extension to X, Y and Z coordinates is straightforward.

Referring to FIG. 10, the expected location of the UE 100 is assumed to have been determined using measurements that do not include measurements for the ambiguous cell 1000. The expected location of the UE 100 is the location 1010 in FIG. 3 which in this example has an uncertainty of n meters (e.g. n=200 meters) in any direction. This means the most probable actual location for UE 100 is within the circle 1030 with radius 1020 equal to n meters centered on the expected location 1010. It is also assumed in this example that the UE 100 makes one or more measurements for the ambiguous cell 1000 (e.g. of RSSI, S/N, RTT, Rx-Tx, etc.) for one radio source in the ambiguous cell 1000 (e.g. for the antenna element AE1 or AE2). The expected distance between the UE 100 and the measured radio source in the ambiguous cell 1000 may then be estimated (e.g. as described earlier) to be between a minimum of p meters and a maximum of q meters (e.g. p=200 meters and q=300 meters). The probable actual location of the UE 100 would then lie within an annulus with outer radius equal to q meters and inner radius equal to p meters centered on the measured radio source for the ambiguous cell. If the measured radio source is the antenna element AE1, the UE 100 would lie within the annulus 1060 with inner radius 1050 equal to p meter and outer radius 1040 equal to q meters. If the measured radio source is the antenna element AE2, the UE 100 would lie within the annulus 1090 with inner radius 1080 equal to p meters and outer radius 1070 equal to q meters.

In the example in FIG. 10, the annulus 1060 for antenna element AE1 overlaps with the circle 1030 within which UE 100 is probably located but the annulus 1090 for antenna element AE2 does not overlap with the circle 1030. This means that the UE 100 is unlikely to have measured the antenna element AE2 because the locations for the UE 100 implied by such a measurement are not consistent with the expected location of UE 100 (within the circle 1030) determined using other measurements not involving the ambiguous cell 1000. Conversely, the UE 100 may have measured the antenna element AE1 because the locations for the UE 100 implied by such a measurement are consistent with the expected location of UE 100 determined using other measurements not involving the ambiguous cell 1000. For example, the UE 100 could be located in the area of overlap 1060A between the annulus 1060 and the internal area of the circle 1030. If the ambiguous cell 1000 contains other antenna elements (e.g. AE3 to AEM as in FIG. 3 and not shown in FIG. 10) and annuli similar to 1060 and 1090 are determined for each of these antenna elements using the distances p and q and if none of these annuli overlap with the circle 1030, then it may be assumed in this example that the UE 100 measured the antenna element AE1. In that case a more accurate location for the UE 100 may be determined as the area of overlap 1060A between the internal area of the circle 1030 and the annulus 1060. If one or more of the annuli for other antenna elements of the ambiguous cell 1000 do overlap with the circle 1030 but if the area of overlap is much smaller than for the antenna element AE1, then in some implementations it may still be assumed that the UE 100 measured the antenna element AE1. FIG. 10 illustrates how ECID measurements that enable a distance estimate between a UE and a radio source within an ambiguous cell may enable a previously less accurate location estimate for a UE (e.g. the circle 1030 in FIG. 10) to be improved (e.g. by using the area of overlap 1060A between the annulus 1060 and the internal area of the circle 1030 in FIG. 10).

In some embodiments, a measured reference source (e.g. one of the antenna elements AEm in FIG. 3) may be determined separately using two or more different measurements by a UE 100 of an ambiguous cell such as that for the eNB N+1 312 in FIG. 2. If the measured reference source is determined to be the same radio source using the different measurements, a location server or UE 100 may have a higher confidence that this reference source was measured by the UE 100 and the location server or UE 100 may then use the two or more different measurements for the ambiguous cell to improve the accuracy of a location estimate for the UE 100. As an example, the measured reference source may be determined for an ambiguous cell using one or more ECID measurements as described in association with FIG. 10 and may be separately determined using one or more OTDOA RSTD measurements for the ambiguous cell as described in association with FIG. 3 and equations (1) to (16). If the same measured reference source is determined in both cases (e.g. AE1 as described for FIG. 10), the location server or UE 100 may assume this was the reference source measured by the UE 100 for both the ECID and the OTDOA RSTD measurements and may combine all the measurements assuming this measured reference source to obtain a more accurate location for the UE 100.

The techniques described in association with UE location determination using ECID in FIG. 10 are described geometrically whereas the techniques described in association with UE location determination using OTDOA in FIG. 3 are described algebraically. However, these techniques may be complementary and interchangeable. For example, the technique of determining an overlapping area (e.g. the area 1060A) in FIG. 10 for ECID measurements can be similar or equivalent to determining an error equal to the difference between (a) the distance between the expected location 1010 of the UE 100 and each possible measured radio source (e.g. AE1, AE2) and (b) the distance between the UE 100 and the measured radio source estimated using ECID measurements (e.g. RTT, RSSI, S/N or TA). The radio source for which this error (i.e. the difference between (a) and (b) above) is minimized may be the radio source measured by the UE 100. Similarly in the case of FIG. 3, instead of finding the measured radio source (e.g. particular antenna element AEm) for an ambiguous cell (e.g. for eNB N+1 312) by minimizing an error term as in equation (16), the location of the UE 100 may be found on a hyperboloid (or a hyperbola for just X and Y coordinates) defined by an RSTD measurement for the measured radio source using equation (15) and almanac data (e.g. X,Y,Z coordinates and internal signal delays) for the reference cell and each possible radio source for the ambiguous cell. This hyperboloid (or hyperbola) will depend on which radio source (e.g. which antenna element AEm in the case of FIG. 3) is measured by the UE. In addition, if the RSTD measurement has some uncertainty (e.g. caused by measurement error and/or signal multipath), the hyperboloid (or hyperbola) will have some uncertainty and may be represented by a hyperbolic volume (or hyperbolic area when only X and Y coordinates are used) between two extreme hyperboloids (or two extreme hyperbolas) similar to the areas shown in FIG. 10 for the annuli 1060 and 1090. The intersection of this hyperbolic volume (or hyperbolic area) for each possible radio source measured by the UE (e.g., for each of antenna elements AE1 to AEM in the example of FIG. 3) with the expected location of the UE (e.g. such as the internal area of the circle 1030 in FIG. 10) determined by measurements that do not involve the ambiguous cell may then be used, similarly to that described for FIG. 10, to determine the measured radio source for the ambiguous cell. For example, the measured radio source may be assumed to be the radio source for which the determined hyperbolic volume (or area) has the greatest overlap with an uncertainty volume (or area), similar to the internal area of the circle 1030 in FIG. 10, that contains the expected location for the UE 100. Alternatively, the measured radio source may be assumed to be the radio source for which the determined hyperbolic volume (or area) has some overlap with an uncertainty volume (or area) that contains the expected location of the UE in the case that only one hyperbolic volume (or area) has such an overlap.

The terms "machine-readable medium" and "computer-readable medium," as used herein, refer to any medium that participates in providing data that causes a machine to operate in a specific fashion. In an embodiment implemented using the UE 100 and/or the computer system 900, various computer-readable media might be involved in providing instructions/code to processor(s) 111, 910 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 140, 925. Volatile media include, without limitation, dynamic memory, such as the working memory 140, 935. Transmission media include, without limitation, coaxial cables, copper wire and fiber optics, including the wires that comprise the bus 101, 905, as well as the various components of the communications subsystem 930 (and/or the media by which the communications subsystem 930 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, a Blu-Ray disc, any other optical medium, punch cards, paper tape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 111, 910 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the UE 100 and/or computer system 900. These signals, which might be in the form of electromagnetic signals, acoustic signals, optical signals and/or the like, are all examples of carrier waves on which instructions can be encoded, in accordance with various embodiments of the invention.

The methods, systems, and devices discussed above are examples. Various alternative configurations may omit, substitute, or add various procedures or components as appropriate. For instance, in alternative methods, stages may be performed in orders different from the discussion above, and various stages may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

As used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.).

As used herein, including in the claims, unless otherwise stated, a statement that a function or operation is "based on" an item or condition means that the function or operation is based on the stated item or condition and may be based on one or more items and/or conditions in addition to the stated item or condition.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A method for locating a user equipment (UE) comprising:
    providing location assistance data to the UE, wherein the location assistance data includes at least one ambiguous cell;
    providing a request to the UE for measurement data;
    receiving measurement data from the UE, wherein the measurement data includes at least one measurement for an ambiguous cell, wherein the ambiguous cell utilizes at least one of a distributed antenna system or a positioning reference signal identical to that of another nearby cell; and
    calculating a current position of the UE based at least in part on the at least one measurement for the ambiguous cell.

2. The method of claim 1 wherein the UE is configured to access a Long Term Evolution (LTE) network and the at least one measurement for the ambiguous cell is a reference signal time difference (RSTD) measurement for an Observed Time Difference of Arrival (OTDOA) position method.

3. The method of claim 2 wherein the ambiguous cell is a reference cell.

4. The method of claim 2 wherein the ambiguous cell is a neighbor cell.

5. The method of claim 2 wherein providing the location assistance data to the UE includes sending an LTE Positioning Protocol (LPP) Provide Assistance Data message to the UE.

6. The method of claim 2 wherein receiving the measurement data from the UE includes receiving an LPP Provide Location Information message from the UE.

7. The method of claim 1 wherein calculating the current position of the UE includes determining an antenna location for the ambiguous cell.

8. A method for locating a User Equipment (UE) comprising:
    receiving location assistance data from a location server, wherein the location assistance data includes an ambiguous cell;
    receiving a request for measurements from the location server;
    making one or more measurements for a plurality of cells wherein at least one measurement is for the ambiguous cell, wherein the ambiguous cell utilizes one of a distributed antenna system or a positioning reference signal identical to that of another nearby cell; and
    enabling determination of a location for the UE based at least in part on the at least one measurement for the ambiguous cell.

9. The method of claim 8, wherein the enabling determination of the location for the UE comprises sending the measurements for the plurality of cells to the location server.

10. The method of claim 9 wherein sending the measurements for the plurality of cells to the location server includes sending an LPP Provide Location Information message to the location server.

11. The method of claim 8, wherein the enabling determination of the location for the UE comprises determining the location by the UE.

12. The method of claim 11, further wherein the determining the location by the UE is based on an antenna location associated with the ambiguous cell.

13. The method of claim 8 wherein receiving the location assistance data from the location server includes receiving an LTE Positioning Protocol (LPP) Provide Assistance Data message from the location server.

14. The method of claim 8, wherein the at least one measurement for the ambiguous cell is a measurement of a reference signal time difference (RSTD) for an Observed Time Difference of Arrival (OTDOA) position method for LTE access.

15. The method of claim 14, wherein the ambiguous cell is a reference cell.

16. The method of claim 14, wherein the ambiguous cell is a neighbor cell.

17. An apparatus for locating a user equipment (UE) comprising:
a memory;
a communications subsystem;
at least one processor operably coupled to the memory and the communications subsystem and configured to:
provide location assistance data to the UE, wherein the location assistance data includes at least one ambiguous cell;
provide a request to the UE for measurement data;
receive the measurement data from the UE, wherein the measurement data includes at least one measurement for an ambiguous cell, wherein the ambiguous cell utilizes at least one of a distributed antenna system or a positioning reference signal identical to that of another nearby cell; and
calculate a current position of the UE based at least in part on the at least one measurement for the ambiguous cell.

18. The apparatus of claim 17 wherein the UE is configured to access a Long Term Evolution (LTE) network and the at least one measurement for the ambiguous cell is a reference signal time difference (RSTD) measurement for an Observed Time Difference of Arrival (OTDOA) position method.

19. The apparatus of claim 18 wherein the ambiguous cell is a reference cell.

20. The apparatus of claim 18 wherein the ambiguous cell is a neighbor cell.

21. The apparatus of claim 18 wherein the at least one processor is configured to provide the location assistance data to the UE by sending an LTE Positioning Protocol (LPP) Provide Assistance Data message to the UE.

22. The apparatus of claim 18 wherein the at least one processor is configured to receive the measurement data from the UE by receiving an LPP Provide Location Information message from the UE.

23. The apparatus of claim 17 wherein the at least one processor is configured to calculate the current position of the UE based on an antenna location for the ambiguous cell.

24. An apparatus for locating a User Equipment (UE) comprising:
a memory;
a communications interface;
at least one processor operably coupled to the communications interface and the memory, and configured to:
receive location assistance data from a location server, wherein the location assistance data includes an ambiguous cell;
receive a request for measurements from the location server;
determine measurements for a plurality of cells wherein at least one measurement is for the ambiguous cell, wherein the ambiguous cell utilizes one of a distributed antenna system or a positioning reference signal identical to that of another nearby cell; and
determine a location for the UE based at least in part on the at least one measurement for the ambiguous cell.

25. The apparatus of claim 24, wherein the at least one processor is further configured to send the measurements for the plurality of cells to the location server.

26. The apparatus of claim 24, wherein the at least one processor is further configured to determine the location by the UE.

27. The apparatus of claim 26, wherein the at least one processor is further configured to receive location assistance data from the location server, wherein the location assistance data includes an antenna location for the ambiguous cell and wherein the at least one processor is configured to determine the location by the UE based on the location assistance data.

28. The apparatus of claim 24 wherein the at least one processor is further configured to receive an LTE Positioning Protocol (LPP) Provide Assistance Data message from the location server.

29. The apparatus of claim 24 wherein the at least one processor is further configured to send an LPP Provide Location Information message to the location server.

30. The apparatus of claim 24, wherein the at least one measurement for the ambiguous cell is a measurement of a reference signal time difference (RSTD) for an Observed Time Difference of Arrival (OTDOA) position method for LTE access.

* * * * *